United States Patent
Suzuki et al.

(10) Patent No.: US 6,961,903 B2
(45) Date of Patent: *Nov. 1, 2005

(54) APPARATUS AND METHOD FOR REPRODUCING CHARACTER INFORMATION RECORDED ON A RECORDING MEDIUM

(75) Inventors: Yosuke Suzuki, Kanagawa (JP); Masahiro Takahashi, Kanagawa (JP)

(73) Assignee: Sony Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/286,480

(22) Filed: Apr. 5, 1999

(65) Prior Publication Data

US 2002/0180773 A1 Dec. 5, 2002

(30) Foreign Application Priority Data

Apr. 7, 1998 (JP) .......................................... 10-094582

(51) Int. Cl.$^7$ ............................ G06F 3/00; G06F 15/16
(52) U.S. Cl. ...................................... 715/716; 709/217
(58) Field of Search ................................ 715/716–729, 715/733, 738, 853–855, 739, 500.1, 501.1; 705/26, 27; 369/30.01, 30.04, 30.07, 30.09; 386/95, 126, 125, 69, 70, 45; 707/5, 6, 10, 104.1; 709/217; 725/37–61; 345/810, 825, 835, 716, 752, 760

(56) References Cited

U.S. PATENT DOCUMENTS

| | | | | |
|---|---|---|---|---|
| 4,847,696 A | * | 7/1989 | Matsumoto et al. | .......... 386/83 |
| 5,794,249 A | * | 8/1998 | Orsolini et al. | ............. 707/104 |
| 5,825,739 A | * | 10/1998 | Saito et al. | .............. 369/47.13 |
| 5,831,616 A | * | 11/1998 | Lee | .............................. 345/861 |
| 5,845,290 A | * | 12/1998 | Yoshii | ......................... 707/104 |
| 5,889,747 A | * | 3/1999 | Hisamatsu et al. | ...... 369/47.14 |
| 5,915,001 A | * | 6/1999 | Uppaluru | .................. 379/88.17 |
| 5,930,446 A | * | 7/1999 | Kanda | ......................... 386/52 |
| 5,982,979 A | * | 11/1999 | Omata et al. | .................. 386/69 |
| 5,995,105 A | * | 11/1999 | Reber et al. | ................. 345/835 |
| 6,044,466 A | * | 3/2000 | Anand et al. | ................ 713/200 |
| 6,047,292 A | * | 4/2000 | Kelly et al. | .................. 345/716 |
| 6,088,304 A | * | 7/2000 | Aramaki et al. | .......... 369/30.09 |
| 6,147,949 A | * | 11/2000 | Yamagishi | ................ 369/47.13 |
| 6,192,183 B1 | * | 2/2001 | Taniguchi et al. | ............. 386/52 |
| 6,295,058 B1 | * | 9/2001 | Hsu et al. | .................... 345/724 |

(Continued)

OTHER PUBLICATIONS

Mark R. Brown, Special Edition Using Netscape, Que, 1995.*

Netscape Communicator (screenshots), 2000.*

*Primary Examiner*—Kristine Kincaid
*Assistant Examiner*—Le Nguyen
(74) *Attorney, Agent, or Firm*—Frommer Lawrence & Haug LLP; William S. Frommer

(57) ABSTRACT

At a first step, a disc is mounted on a playback apparatus. Subsequently, at a second step, CD-TEXT data recorded in the lead-in area of the disc is read out and decoded before being stored into a memory unit. Then, the CD-TEXT data containing character information is searched for a string of characters. The second step is followed by a third step to form a judgment as to whether or not a string of characters representing address information has been found in the search. If found, then at a fourth step, the string of characters found in the search is recognized as address information and displayed in a format for a string of characters representing a URL or an electronic-mail address. As a result, CD-TEXT data can be searched for a string of characters which is recognized as address information.

13 Claims, 18 Drawing Sheets

U.S. PATENT DOCUMENTS

| | | | |
|---|---|---|---|
| 6,295,533 B2 * | 9/2001 | Cohen | 704/9 |
| 6,321,024 B1 * | 11/2001 | Fujita et al. | 386/55 |
| 6,334,025 B1 * | 12/2001 | Yamagami | 386/95 |
| 6,343,180 B1 * | 1/2002 | Kim | 386/65 |
| 6,360,254 B1 * | 3/2002 | Linden et al. | 709/219 |
| 6,366,298 B1 * | 4/2002 | Haitsuke et al. | 345/736 |
| 6,377,978 B1 * | 4/2002 | Nguyen | 709/206 |
| 6,408,301 B1 * | 6/2002 | Patton et al. | 707/102 |
| 6,449,634 B1 * | 9/2002 | Capiel | 709/206 |
| 6,449,653 B2 * | 9/2002 | Klemets et al. | 709/231 |
| 6,504,553 B2 * | 1/2003 | Fado et al. | 345/727 |
| 6,538,676 B1 * | 3/2003 | Peters | 345/863 |
| 6,625,388 B2 * | 9/2003 | Winter et al. | 386/83 |

* cited by examiner

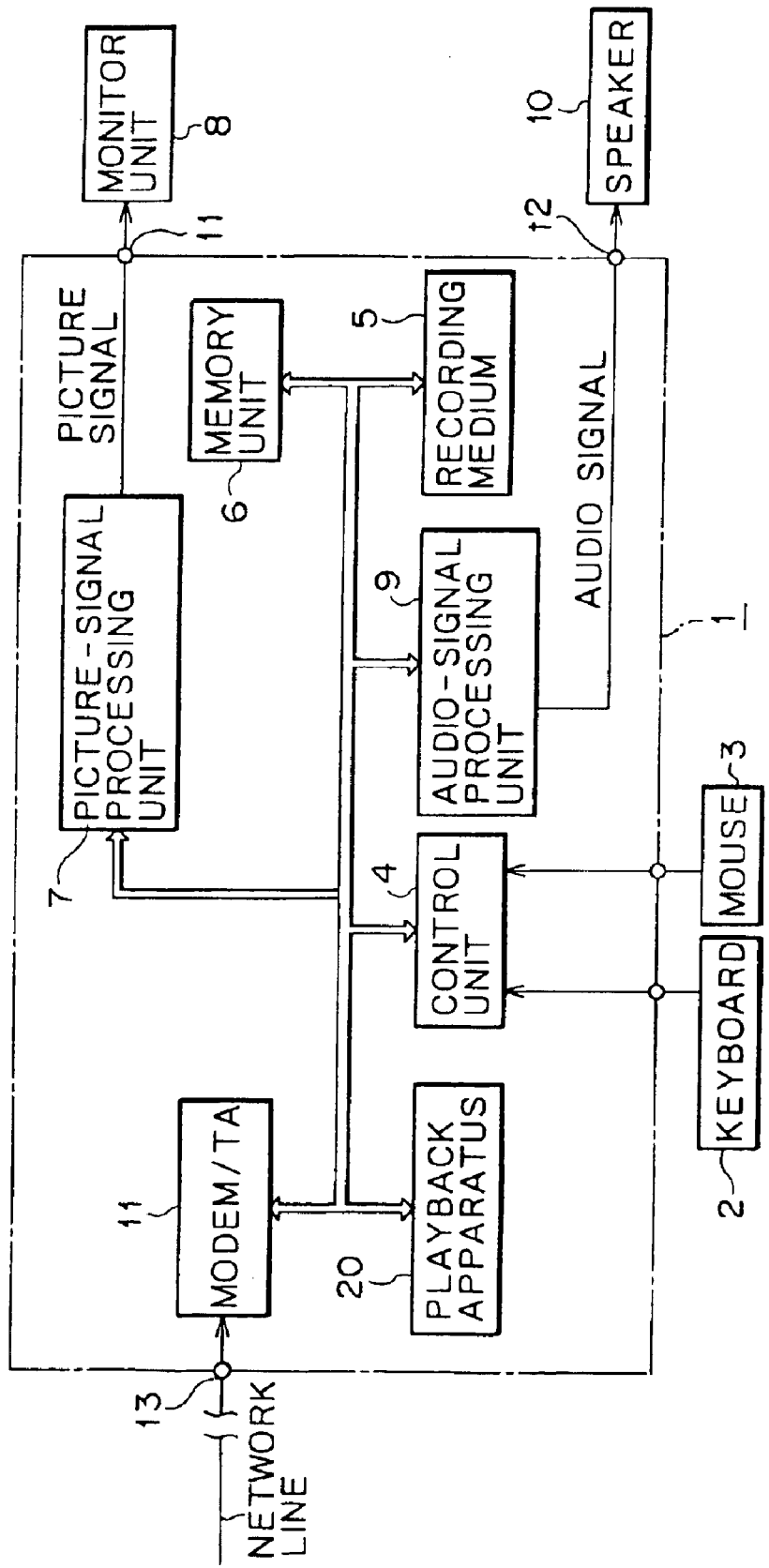

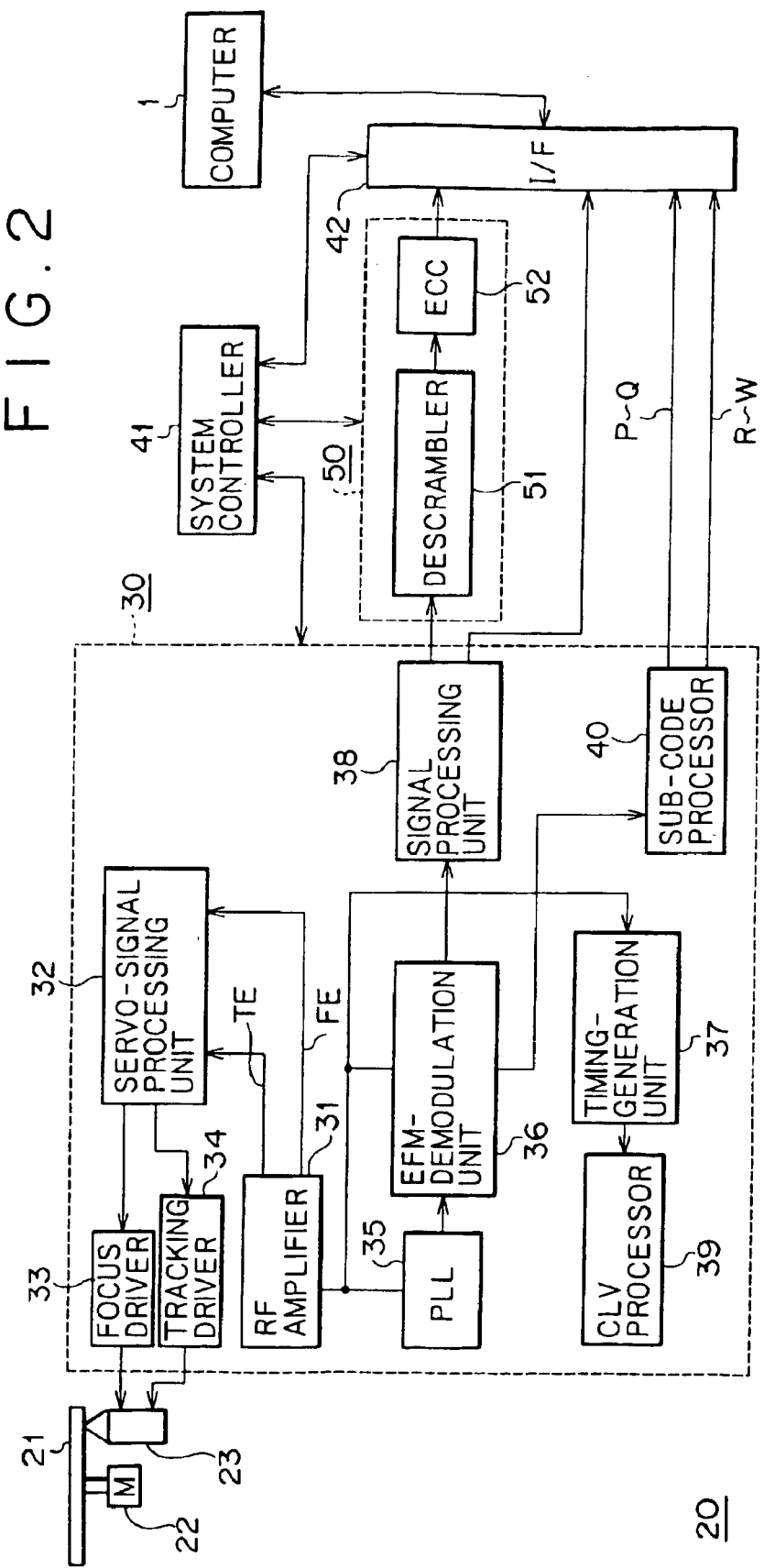

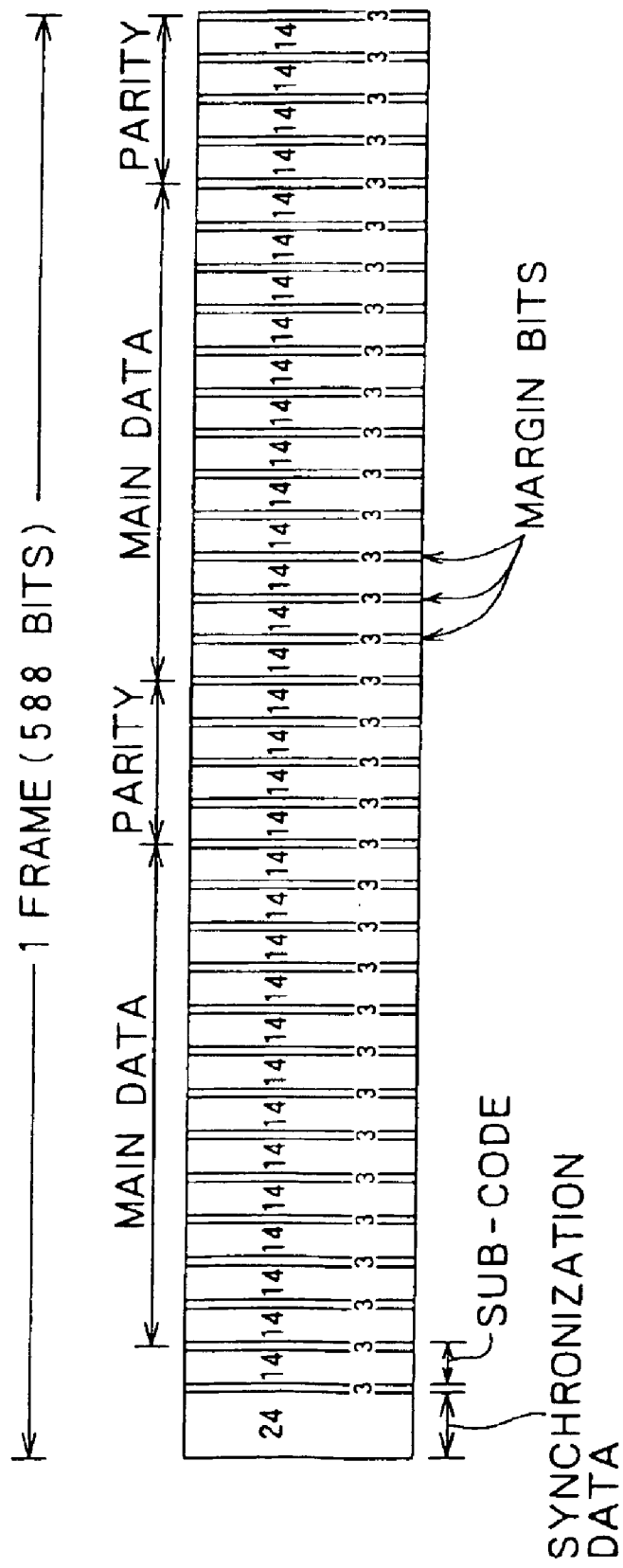

FIG. 4A

| FRAME | SUB-CODING FRAME | | | | | | |
|---|---|---|---|---|---|---|---|
| 98n+1 | SYNCHRONIZATION PATTERN (S0) | | | | | | |
| 98n+2 | SYNCHRONIZATION PATTERN (S1) | | | | | | |
| 98n+3 | $P_1$ | $Q_1$ | $R_1$ | $S_1$ | $T_1$ | $U_1$ | $V_1$ | $W_1$ |
| 98n+4 | $P_2$ | $Q_2$ | $R_2$ | $S_2$ | $T_2$ | $U_2$ | $V_2$ | $W_2$ |
| ⋮ | ⋮ | ⋮ | ⋮ | ⋮ | ⋮ | ⋮ | ⋮ | ⋮ |
| 98n+97 | $P_{95}$ | $Q_{95}$ | $R_{95}$ | $S_{95}$ | $T_{95}$ | $U_{95}$ | $V_{95}$ | $W_{95}$ |
| 98n+98 | $P_{96}$ | $Q_{96}$ | $R_{96}$ | $S_{96}$ | $T_{96}$ | $U_{96}$ | $V_{96}$ | $W_{96}$ |
| $98_{(n+1)}+1$ | | | | | | | |

FIG. 4B

| $Q_1 \sim Q_4$ | $Q_5 \sim Q_8$ | $Q_9 \quad \sim \quad Q_{80}$ | $Q_{81} \sim Q_{96}$ |
|---|---|---|---|
| CONTROL | ADDRESS | SUB-QDATA | CRC |

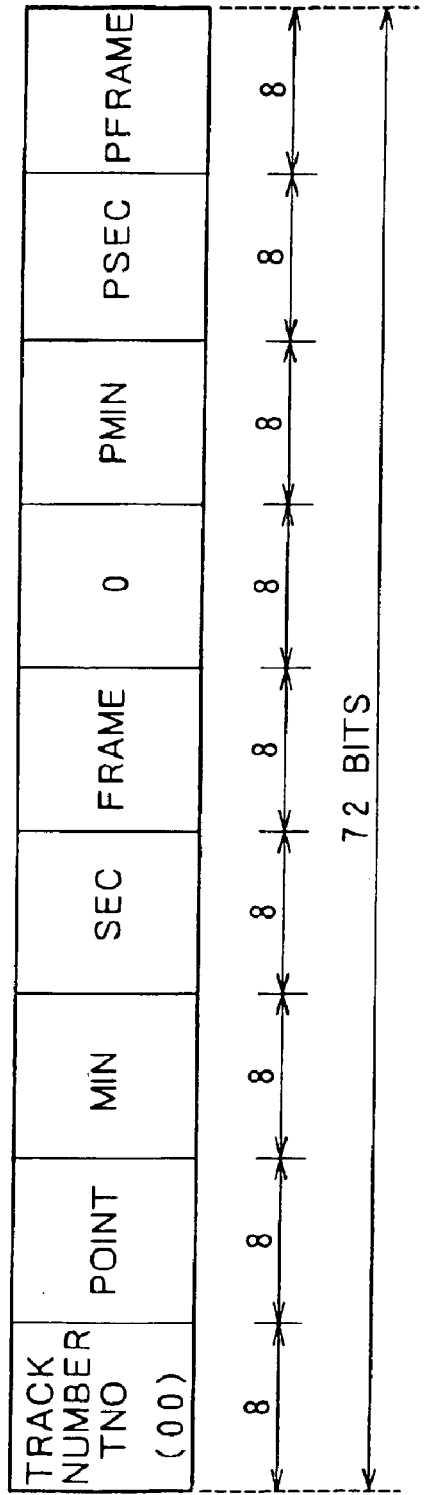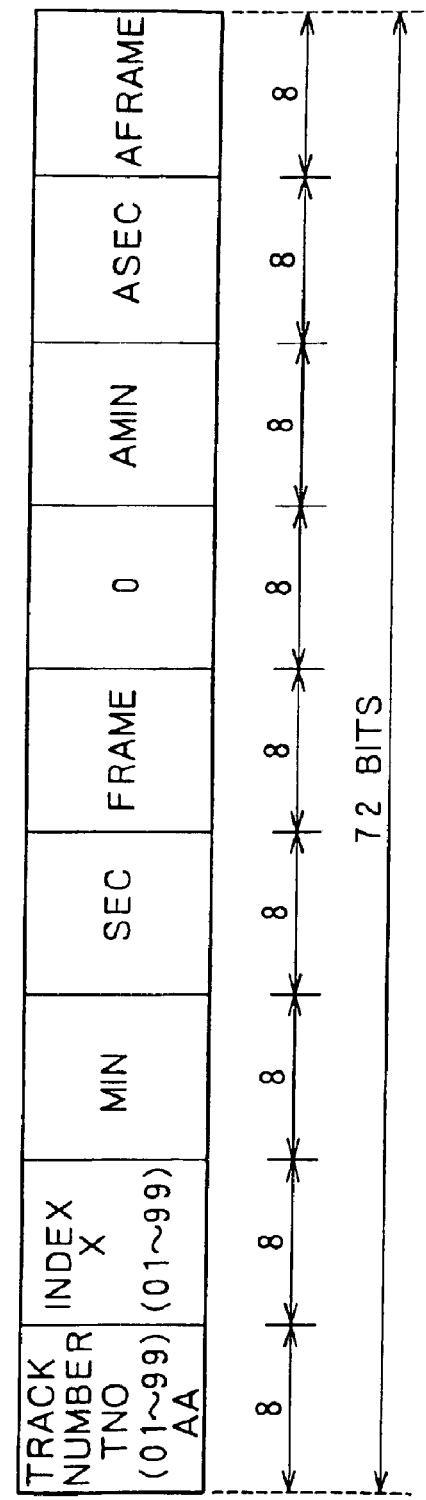

FIG.6

| TNO | BLOCK NO. | POINT | PMIN, PSEC, PFRAME | |
|---|---|---|---|---|
| 00 | n | 01 | 00.02.32 | START POINT OF TRACK #1 |
| ↓ | n+1 | 01 | 00.02.32 | |
| | n+2 | 01 | 00.02.32 | |
| | n+3 | 02 | 10.15.12 | START POINT OF TRACK #2 |
| | n+4 | 02 | 10.15.12 | |
| | n+5 | 02 | 10.15.12 | |
| | n+6 | 03 | 16.28.63 | START POINT OF TRACK #3 |
| | n+7 | 03 | 16.28.63 | |
| | n+8 | 03 | 16.28.63 | |
| | n+9 | 04 | · · | |
| | n+10 | 04 | · · | |
| | n+11 | 04 | · · | |
| | n+12 | 05 | · · | |
| | n+13 | 05 | · · | |
| | n+14 | 05 | · · | |
| | n+15 | 06 | 49.10.03 | START POINT OF TRACK #6 |
| | n+16 | 06 | 49.10.03 | |
| | n+17 | 06 | 49.10.03 | |
| | n+18 | A0 | 01.00.00 | TRACK NUMBER OF THE FIRST TRACK ON THE DISC |
| | n+19 | A0 | 01.00.00 | |
| | n+20 | A0 | 01.00.00 | |
| | n+21 | A1 | 06.00.00 | TRACK NUMBER OF THE LAST TRACK ON THE DISC |
| | n+22 | A1 | 06.00.00 | |
| | n+23 | A1 | 06.00.00 | |
| | n+24 | A2 | 52.48.41 | START POINT OF A LEAD-OUT TRACK |
| ↓ | n+25 | A2 | 52.48.41 | |
| 00 | n+26 | A2 | 52.48.41 | |
| 00 | n+27 | 01 | 00.02.32 | REPEATED |
| ↓ | n+28 | 01 | 00.02.32 | |
| | · | · | · · | |
| ↓ | · | · | · · | |

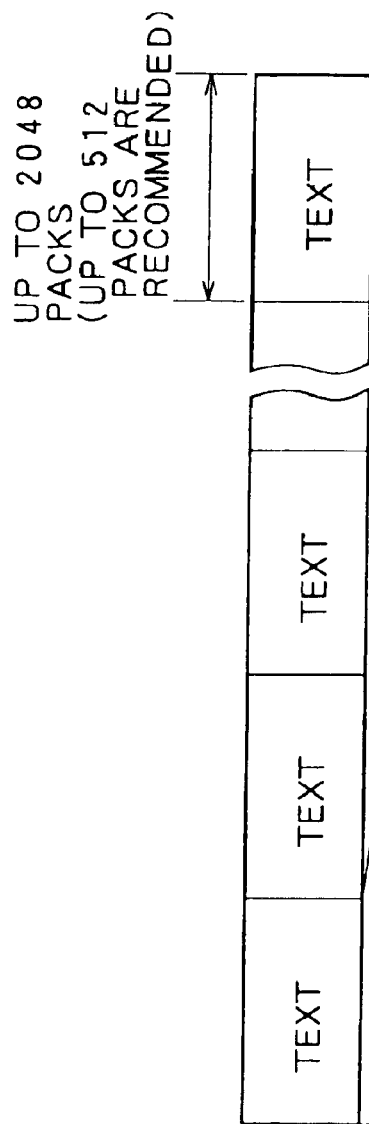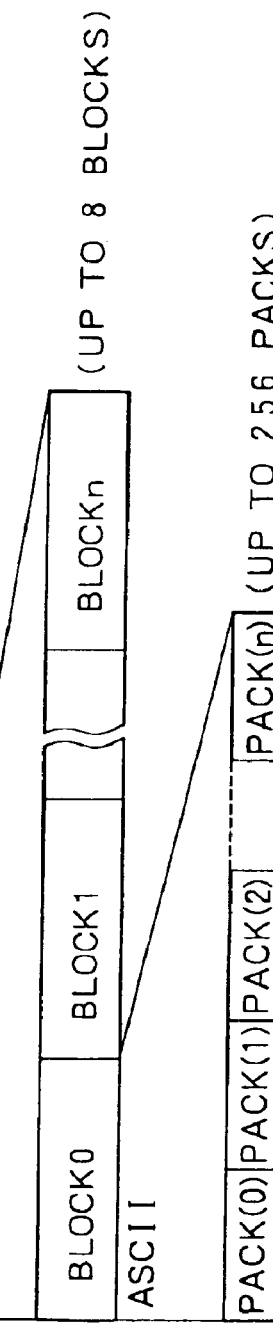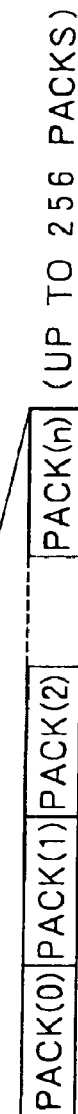
FIG. 7A
FIG. 7B
FIG. 7C

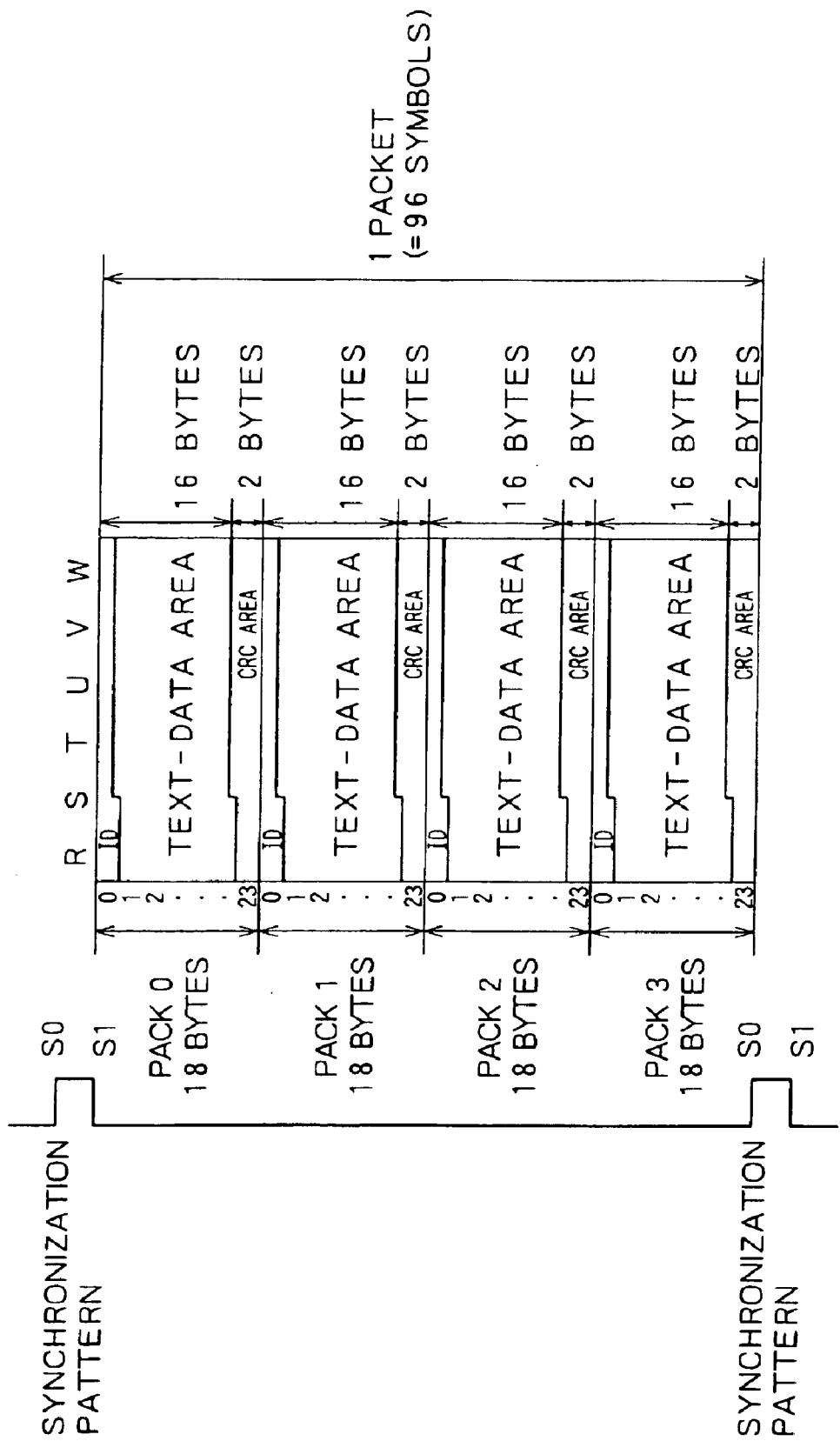

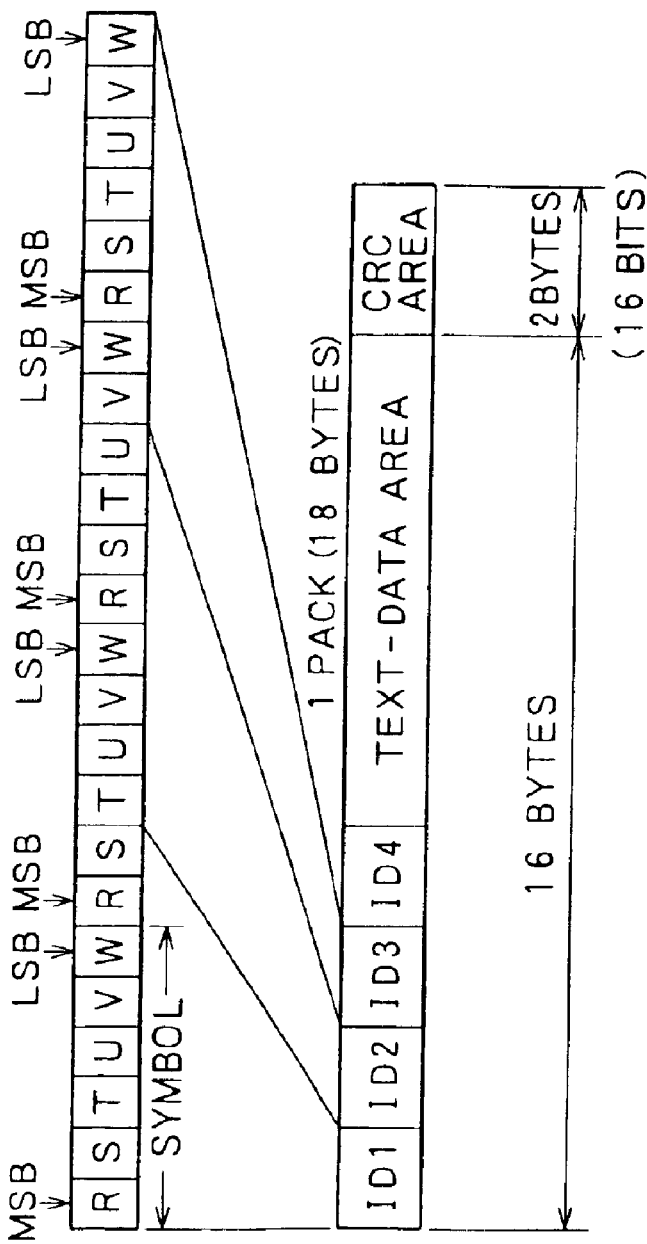

FIG.14

| ID1 | DESCRIPTION OF THE IDENTIFICATION |
|---|---|
| 80h | ALBUM NAME (ID2=00h)/TRACK SONG NAME (ID2=01h to 63h) |
| 81h | PERFORMER/CONDUCTOR/ORCHESTRA NAME |
| 82h | NAME OF SONG-WORD COMPOSER |
| 83h | NAME OF SONG WRITER |
| 84h | NAME OF MUSIC ARRANGER |
| 85h | MESSAGE |
| 86h | DISC ID |
| 87h | GENRE |
| 88h | TOC |
| 89h | 2ND TOC |
| 8Ah | RESERVED |
| 8Bh | RESERVED |
| 8Ch | RESERVED |
| 8Dh | CONTROL |
| 8Eh | Pos/ISRC |
| 8Fh | SIZE |

APPARATUS AND METHOD FOR REPRODUCING CHARACTER INFORMATION RECORDED ON A RECORDING MEDIUM

BACKGROUND OF THE INVENTION

The present invention relates to a playback-signal processing apparatus, for searching character information for a string of characters representing an address, and generating the address.

In recent years, a network comprising, for example, personal computers ("computer(s)") owned by users, and servers connected to the personal computers by telephone lines, is becoming popular.

The user is capable of obtaining various kinds of information from a server employed in the network, by using the computer as a terminal of the network. The user activates, for example, web browser software displaying information on a display device, and enters a URL (Uniform Resource Locator) into an "address box." The user accesses the server specified by the URL, through paths on the network. The computer is thereby capable of receiving various kinds of information, such as, characters and pictures, transmitted by the server.

There is also known, an audio CD that allows character information to be recorded in a TOC (Table of Contents), in a lead-in area of the CD. This type of CD is known as a CD-TEXT. The character information added to the TOC is information, such as, the title of the disc, names of artists, and/or titles of pieces of music. By reading out such pieces of information from the audio CD and displaying them on a screen, information about the contents of the audio CD can be obtained.

An apparatus for playing back information from an audio CD can be connected to, or embedded in, a computer. Various processing by this type of apparatus, such as, playback and halt operations, can be controlled by the computer. In this case, the user carries out a variety of operations on, for example, operation screens generated by the computer and displayed on a monitor unit as a GUI (Graphical User Interface).

An operation screen shows, among other things, performance times of pieces of music, character information, such as, names of artists, and titles of pieces of music, and buttons to be operated by the user for carrying out various kinds of processing. What appear on the operation screen are all obtained from a TOC. If more information on the pieces of music and the artists is available in the network, a URL where the information can be found is recorded in the TOC as character information. Moreover, if it is possible to transmit an electronic mail to an artist, the mail address of the artist is also included in the TOC as character information.

In order to access a URL, however, it is necessary for the user to enter a string of characters representing the URL. In addition, when the browser software is not activated, an operation to invoke the browser software needs to be carried out.

Furthermore, in order to send electronic mail, it is necessary for the user to enter a string of characters representing a mail address, using mail-sending software, which is referred to hereafter simply as "a mailer."

As described above, the user has to laboriously enter a string of characters to access the server, in spite of the fact that the string of characters is already recorded in the TOC. The user is further inconvenienced by having to search character information, stored in the TOC, for the string of characters representing the address, or by having to activate a browser.

In addition, when a user incorrectly enters a string of characters representing, for example, a URL, she incurs delay by having to re-enter the string.

SUMMARY OF THE INVENTION

It is an object of the present invention to address the problems described above, by providing an apparatus and a method for reproducing character information from a recording medium, and for recognizing the character information as an address.

In order to solve the problems described above, the present invention provides an apparatus for processing a playback signal, the apparatus comprising:

a playback means for reproducing information recorded on a recording medium;

a character-information detecting means for detecting character information recorded in an information control area of the recording medium and reproduced by the playback means;

a character-string searching means for searching character information detected by the character-information detecting means for a string of characters representing address information; and an address-information generating means for generating address information on the basis of a search result output by the character-string searching means.

In addition, the present invention also provides a playback-signal processing apparatus comprising:

a memory means for storing character information reproduced from a recording medium;

a search means for searching the character information stored in the memory means for a string of characters representing address information; and a display control means for displaying information indicating whether or not the address information is included in the character information in accordance with a search result output by the search means on a display means along with the character information.

Furthermore, the present invention also provides a method for reproducing character information from a recording medium for recording audio data, the method comprising the steps of:

reproducing character information from the recording medium;

searching the reproduced character information for a string of characters representing address information; and displaying information indicating whether or not the address information is included in the character information in accordance with a search result.

According to the present invention, a string of characters corresponding to address information can be recognized as address information from character information stored on a recording medium. In addition, the present invention eliminates the need for the user to enter a complex string of characters in order to access such an address.

BRIEF DESCRIPTION OF THE DRAWINGS

FIG. 1 is an explanatory block diagram showing the configuration of a computer implemented by an embodiment of the present invention;

FIG. 2 is an explanatory block diagram showing the configuration of a playback apparatus (a CD player) implemented by an embodiment of the present invention;

FIG. 3 is an explanatory diagram showing the frame structure of a disc (a CD);

FIGS. 4A and 4B are explanatory diagrams used for explaining sub-coding of a disc (a CD);

FIGS. 5A and 5B are explanatory diagrams used for explaining sub-Q data of a disc (a CD);

FIG. 6 is an explanatory diagram used for explaining TOC data of a disc (a CD);

FIGS. 7A, 7B and 7C are explanatory diagrams comprehensively showing the structure of text data;

FIG. 9 is an explanatory diagram showing the structure of a packet as text data;

FIGS. 10A and 10B are explanatory diagrams used for explaining a process of forming a pack from data of symbol units as a structure of text data;

FIG. 14 is an explanatory diagram showing the defined contents of ID1;

DETAILED DESCRIPTION OF THE PREFERRED EMBODIMENTS

Figures 8A, 8B, 8C:
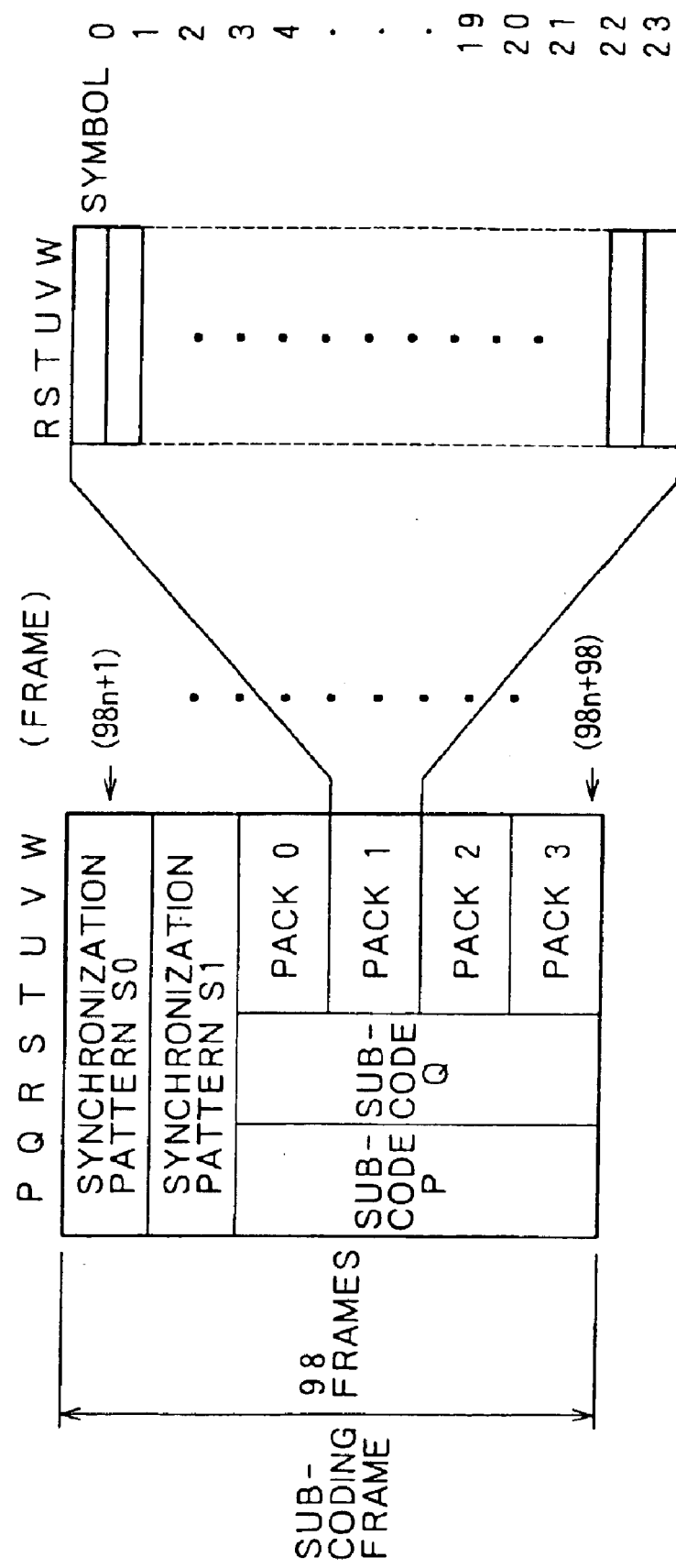
FIGS. 8A, 8B and 8C are explanatory diagrams showing a structural relation between a sub-coding frame and text data.

The present invention will become more apparent from the following detailed description of some preferred embodiments with reference to the accompanying drawings. A playback apparatus implemented by an embodiment of the present invention is a CD player which is capable of playing back a signal from an optical disc (CD).

It should be noted that the description is given in the following order.

(1) Configuration of the Computer
(2) Configuration of the Playback Apparatus
(3) TOC and Sub-code
(4) Text Data
(5) Display Formats of the Operation Screen
(6) Disc Mounting Processing
(1) Configuration of a Computer FIG. 1 is an explanatory functional block diagram showing the configuration of a computer. Functional blocks shown in FIG. 1, other than a playback apparatus 20, can be implemented by software or hardware.

A computer 1 is implemented by the so-called personal computer. The computer 1 is designed to carry out basic operations by execution of software called an operating system (OS), and a variety of applications to satisfy needs of the user, by execution of software called application programs. Application programs in this embodiment include a driver, for driving a playback apparatus such as a CD player, to be described later, and a browser for viewing information obtained from a network, such as, the Internet.

An input unit used by the user for entering commands requesting various kinds of processing include a keyboard 2 and a mouse 3. Various kinds of operation information entered via the keyboard 2 and the mouse 3 are supplied to a control unit 4 which then executes control of functional blocks described below based on the operation information.

The mouse 3 is used for moving a pointer displayed on a monitor unit. After positioning the pointer to point to one of a variety of icons formed as a GUI by operating the mouse 3, a button on the mouse 3 is clicked to execute a function corresponding to the icon pointed to by the pointer.

A recording medium 5 is implemented typically by a hard disc for storing, among other things, the OS and the variety of application programs. Normally, the OS is loaded from the recording medium 5 into a memory unit 6 when the computer 1 is activated. An application program is loaded from the recording medium 5 into the memory unit 6 when necessary after the computer 1 is activated. The memory unit 6 is implemented typically by a RAM (Random Access Memory).

The memory unit 6 includes a buffer area for storing software loaded from the recording medium 5 after activation of the computer 1, and a work area for storing data used in processing various kinds of software.

The software such as the OS and application programs, which are loaded into the memory unit 6 and activated, include various kinds of data, such as picture data, for constructing the GUI, or audio data, such as an alarm sound. The picture data and the audio data are loaded from the memory unit 6, in accordance with an operation carried out by the user, to be supplied to a picture-signal processing unit 7 and an audio-signal processing unit 9, respectively.

Based on the picture data received from the memory unit 6, the picture-signal processing unit 7 generates picture signals for forming a GUI such as a menu screen for implementing a variety of operations and settings, a window for displaying various kinds of information, and a pointer. A picture signal is then supplied to a monitor unit 8, which is installed at an external location and used for displaying a picture, to be displayed thereon as a GUI picture by way of an output terminal t1.

Based on the audio data received from the memory unit 6, the audio-signal processing unit 9 generates an audio signal, such as an alarm sound, for an operation carried out by the user. The audio-signal processing unit 9 is also capable of generating an audio signal based on data produced by the playback apparatus 20 to be described later. An audio signal generated by the audio-signal processing unit 9 is output to the speaker 10 installed at an external location by way of an output terminal t2.

Alternatively, the monitor unit 8 and the speaker 10 can also be integrated with the computer 1 to form a single body.

An interface unit 11 is provided to enable the computer 1 to receive and transmit various kinds of information to a network through a telephone line used as a network line. Composed of, typically, a modem and a terminal adapter (TA), the interface unit 11 is used for demodulating coded data received from the network line through an interface terminal t3. Then, the demodulated data, which can be characters, a picture or a sound, is stored temporarily into the buffer area of the memory unit 6 to be read out later, selectively, when necessary.

The computer 1 also transmits various kinds of data to a server provided in the network, to serve as a source of various kinds of information for distribution after the data has been temporarily stored in the buffer area of the memory unit 6, and then modulated by the interface unit 11 into properly coded data, and transmitted through the interface terminal t3. Examples of the data are a URL (Uniform Resource Locator) and data generated by the computer 1 for transmission such as electronic mail, text data and picture data. A URL is an address code.

The interface unit 11 can also be provided as a unit external to the computer 1.

The playback apparatus 20 employed in this embodiment is capable of carrying out CD-DA playback processing of audio data recorded on, typically, an optical disc.

If a TOC read out by the playback apparatus 20 includes CD-TEXT data, the CD-TEXT data is stored in the memory unit 6 to be decoded and converted into character information. The decoding of the CD-TEXT data is carried out by the computer 1 by execution of software. Alternatively, hardware for carrying out the decoding of the CD-TEXT data can be provided in the computer 1 or the playback apparatus 20 in place of the decoding software.

Character information includes information about pieces of music recorded on the disc, such as the title of the disc, names of artists, and names of pieces of music, besides address information, such as a URL and electronic-mail address, which can be used for obtaining more information about the pieces of music and the artists from the network.

In the present invention, such character information is searched for a string of characters. When a string of character with a typical format of "http://www.*.*" indicating a URL or a string of character with a typical format of "*@*.." indicating an electronic-mail address is detected, typically, the control unit 4 recognizes this string of characters as a URL or an electronic-mail address which are both referred to hereafter as address information.

These pieces of address information are each displayed typically as an icon or a string of characters along with the information about, for example, names of pieces of music, as will be described later. By selecting one of the icons or the strings of characters, processing to acquire information stored at the URL or processing to invoke software for creating an electronic mail is carried out.

(2) Configuration of the Playback Apparatus

FIG. 2 is an explanatory block diagram showing a typical configuration of the playback apparatus 20.

The playback apparatus 20 has a configuration capable of playing back a signal from a disc 21 such as a CD-ROM, a CD or a CD-TEXT. The disc 21 is mounted on the playback apparatus so that it can be driven into rotation by a spindle motor 22. The playback apparatus 20 is controlled by the control unit 4 employed in the computer 1 shown in FIG. 1 and, with the spindle motor 22 put in a rotating state, data recorded on the disc 21 is read out by an optical pickup 23.

A playback signal generated by the optical pickup 23 is supplied to a servo-signal processing unit 30. In the servo-signal processing unit 30, the playback signal from the disc 21 is received by an RF amplifier 31, which converts the playback RF signal into binary data. The RF amplifier 31 also carries out various kinds of signal processing for generating a tracking-error signal TE and a focus-error signal FE.

The tracking-error signal TE and the focus-error signal FE generated by the RF amplifier 31 are supplied to a servo-signal processing circuit 32, which generates a variety of servo drive signals for executing various kinds of control such as tracking control and focus control from the tracking-error signal TE and the focus-error signal FE. The servo drive signals are supplied to a focus driver 33 and a tracking driver 34 to drive a focus actuator and a tracking actuator, respectively, which are provided in the optical pickup 23 in order to execute a variety of servos.

It should be noted that other servo mechanisms, not shown in the figure, such as a thread mechanism for moving the optical pickup 23 in the radial direction of the disc 21, are also controlled by a servo drive signal generated by the servo-signal processing circuit 32.

The playback RF signal generated by the RF amplifier 31 is supplied to a PLL unit 35, an EFM-demodulation unit 36 and a timing-generation unit 37.

The PLL unit 35 generates a clock signal synchronized with the playback RF signal, supplying the clock signal to the EFM-demodulation unit 36 which carries out processing, such as, EFM demodulation and CIRC decoding, in order to generate a digital audio signal from information read out from the disc 20.

The digital audio signal is supplied to a signal processing unit 38 to be subjected to various kinds of processing, such as, error correction and error-data interpolation, before being output to an interface unit 42. Implemented, typically, by an SCSI (Small Computer System Interface) or an ATAPI (AT Attachment Packet Interface), the interface unit 42 allows the playback apparatus 20 to be connected to the computer 1 shown in FIG. 1.

The timing-generation unit 37 generates a timing signal synchronized with the playback RF signal, supplying the timing signal to a CLV (Constant Linear Velocity) processor 39, which drives the spindle motor 22 to rotate at a constant linear velocity in a state synchronized with the playback RF signal.

A sub-code, separated by the EFM-demodulation unit 36, is supplied to a sub-code processor 40, which carries out various kinds of processing, including detection of an error from the sub-code, and separating data of P and Q channels composing the sub-code, and data of R to W channels, from each other. The pieces of data of P and Q channels, and data of R to W channels are supplied to the interface unit 42.

CD-TEXT data included in the R to W channels of the sub-code, recorded in the TOC, is transferred to the computer 1 by way of the interface unit 42, as will be described later.

In an operation to play back a signal from the disc 21 which is a CD-ROM, a signal output by the servo-signal processing unit 30 is supplied to a signal processing unit 50 for the CD-ROM. In the CD-ROM, a sub-code length of 1/75 seconds is prescribed as a data unit. That is, a data length of 2,352 bytes is treated as 1 block, with a sync of 12 bytes placed at the beginning of the block to be followed by a header of 4 bytes. User data is included in the block after the header. The header includes the same address as an absolute address of the Q channel of the sub-code recorded on a CD. The data structure of the CD-ROM includes prescriptions of mode 0, mode 1, mode 2 (form 1) and mode 2 (form 2). Data other than the sync is scrambled. In addition, an error detection signal or an error correction signal are coded for each block.

Such data for the CD-ROM is divided into blocks, to be subjected to various kinds of processing, such as, error-correction coding and EFM modulation, before being recorded onto the CD-ROM. For this reason, the signal processing unit 50 for a CD-ROM includes a descrambler 51 for descrambling the data and a error-correction circuit 52 for decoding the error-detection signal or the error-correction signal of each block. Playback data of the CD-ROM, generated by the error-correction circuit 52, is transferred to the computer 1 by way of the interface unit 42.

Implemented, typically, by a microcomputer, a system controller 41 controls the servo-signal processing unit 30, the CD-ROM-signal processing unit 50, and the interface unit 42, in order to carry out various kinds of processing. For example, data is played back from the disc 21 in accordance with a read command issued by the computer 1, and the playback data is supplied to the computer 1 by way of the interface unit 42.

(3) TOC and Sub-code

The following is a description of a sub-code and the TOC, recorded in the lead-in area of the disc 21.

The smallest unit of data recorded on the disc 21 is 1 frame. 98 frames constitute 1 block, or 1 subcoding frame.

The structure of 1 frame is shown in FIG. 3.

As shown in the figure, a frame is 588 bits in length. At the head of the frame, 24-bit synchronization data is provided, being followed by 3 margin bits. The margin bits are followed by a 14-bit sub-code data area, which is followed by main data comprising 12 symbols, and parity data comprising 4 symbols.

98 frames, each having such a configuration, constitute 1 block. Sub-codes fetched from 98 frames are gathered to form sub-code data of a block, such as the one shown in FIG. 4A.

To be more specific, sub-codes fetched from the first and the second of the 98 frames, that is, frames (98$n$+1) and (98$n$+2), are used as a synchronization pattern. Sub-codes fetched from the third to the 98th of the 98 frames, that is, frames (98$n$+3) and (98$n$+98), constitute channel data of the 96 bits, that is, sub-code data of the P, Q, R, S, T, U, V and W channels.

The P and Q channels are used for control of operations such as an access. However, the P channel merely shows a pause portion between tracks, so that finer control needs to be carried out by using the Q channel (Q1 to Q96). The 96-bit data of the Q channel has a structure shown in FIG. 4B.

Data of the R to W channels is provided to form a text data group, as will be described later.

Initially, the 4 bits Q1 to Q4 are used as control data, providing information, such as the number of audio channels, existence of an emphasis, and the type of the CD.

In particular, the 4 bits of the control data are defined as follows.

| | |
|---|---|
| "0***" | 2 audio channels |
| "1***" | 4 audio channels |
| "*0**" | CD-DA |
| "*1**" | CD-ROM |
| "**0*" | Impossible digital copying |
| "**1*" | Possible digital copying |
| "***0" | With no preemphasis |
| "***1" | With preemphasis |

The next 4 bits Q5 to Q8 are an address, also serving as control bits of sub-Q data.

In particular, a 4bit address of "0001" indicates that the following sub-Q data Q9 to Q80 is audio Q data, while a 4-bit address of "0100" indicates that the following sub-Q data Q9 to Q80 is video Q data.

Thus, the 72 bits Q9 to Q80 are sub-Q data, whereas the remaining bits Q81 to Q96 are a "CRC".

As described above, sub-Q data recorded in the lead-in area is TOC information.

That is, the sub-Q data composed of the 72 bits Q9 to Q80 of the Q-channel data read out from the lead-in area, has information, such as the one shown in FIG. 5A. As shown in the figure, the sub-Q data comprises pieces of data, each having a length of 8 bits.

The first piece of data is a track number. The track number for the lead-in area is a fixed number of "00".

Following the track number is POINT, which is followed by MIN (minutes), SEC (seconds) and FRAME (a frame number), placed sequentially, one after another.

The last 3 pieces of data are PMIN, PSEC and PFRAME, which have the following meanings depending on the value of POINT.

A value of POINT in the range "01h" to "99h", where the suffix h indicates that the value is expressed in the hexadecimal format, is a track number. In this case, the start point or the absolute-time address of a track indicated by the track number, is recorded in terms of minutes, in PMIN, and seconds, in PSEC, and in terms of a frame number, in PFRAME.

In the case of a POINT value of "A0h", the track number of a first track is recorded in PMIN. A CD-DA, a CD-I, and a CD-ROM, with XA specifications, are distinguished from each other by the value of PSEC.

In the case of a POINT value of "A1h", the track number of a last track is recorded in PMIN.

In the case of a POINT value of "A2h", the start point of a lead-out area is recorded in PMIN, PSEC and PFRAME, as an absolute-time address.

In the case of a disc with data recorded on 6 tracks thereof, the TOC for recording pieces of sub-Q data has a data structure illustrated in FIG. 6.

As shown in FIG. 6, the track numbers TNO are all "00h".

A block number is the number of a piece of sub-Q data of block data comprising 98 frames, as described above.

TOC data is stretched over 3 blocks, each having the same contents.

As shown in FIG. 6, in the case of POINT having a value in the range "01h" to "06h", PMIN, PSEC and PFRAME show the start point of track #1 to track #6, respectively.

In the case of a POINT value of "A0h", the track number "01h" of a first track is recorded in PMIN. A CD-DA, a CD-I, and a CD-ROM with XA specifications are distinguished from each other by the value of PSEC. More specifically, a PSEC value of "00h" indicates that the disc is a CD-DA, and a PSEC value of "20h" indicates that the disc is a CD-ROM with XA specifications. A PSEC value of "10h" indicates that the disc is a CD-I.

In the case of a POINT value of "A1h", the track number of a last track is recorded in PMIN, while in the case of a POINT value of "A2h", the start point of a lead-out area is recorded in PMIN, PSEC and PFRAME, as an absolute-time address.

Block (n+27) and subsequent blocks each contain the same data as blocks n to (n+26).

On the disc 1, sub-Q data recorded on tracks #1 to #n for recording actual data, such as, pieces of music, and the lead-out area includes information shown in FIG. 5B.

As shown in FIG. 6, the first field is a track number which has a value in the range "01h" to "99h". In the lead-out area, the track number is a fixed value of "AAh".

The next field is an index for recording information that allows a track to be divided into finer portions.

An elapsed time of a track is recorded in terms of minutes in MIN, seconds in SEC, and in terms of a frame number in FRAME.

An absolute-time address is recorded in terms of minutes in AMIN and seconds in ASEC, and in terms of a frame number in AFRAME.

The TOC and a sub-code are formed as described above. An address on the disc, that is, AMIN, ASEC and AFRAME, is recorded for each 98 frames, as is obvious from the above description.

As described earlier, the 98 frames constitute 1 block, which is referred to as a sub-coding frame. Thus audio data of 1 second in length includes 75 sub-coding frames. That is, AFRAME, representing an address, has a value in the range "0" to "74". It should be noted that, in frame check processing to be described later, continuity of data is checked in sub-coding-frame units.

(4) Text Data

The following is a description of text data included in sub-codes with structures shown in FIGS. 3 and 4. First, a general structure of text data is explained by referring to FIGS. 7A to 7C.

When only text data is extracted from a sub-code and examined generally, the structure of the text data is illustrated in FIGS. 7A to 7C. The largest unit of text data is a text shown in FIG. 7A. FIG. 7A shows a plurality of texts, which each have the same data contents. That is, a sub-code comprises a predetermined number of recorded texts, each having the same data contents.

1 text comprises a typical maximum of 2,048 packs, to be defined later. Considering the time it takes to read out a text, however, it is recommended that a text be composed of no more than 512 packs. Such a recommended text has a data amount of about 6,500 characters.

As shown in FIG. 7B, a text comprises blocks #0 to #n, where n is prescribed to have a typical value in the range 0 to 7. Thus, a text comprises up to 8 blocks.

The blocks in the text each contain the same information of text data described in a language which varies from block to block. For example, block #0 contains text data representing various kinds of information on the disc described in English, while block #1 contains the same text data as block #0 described in Japanese.

Since a text can be composed of up to 8 blocks, the format of text data for this embodiment can be provided for a maximum of 8 languages.

As shown in FIG. 7C, a block comprises data units, namely, pack #0 to pack #n, where n is a number smaller than 256. Thus, a block is composed of up to 256 packs. The data structure of a pack and information related thereto are described by referring to FIGS. 8, 9 and 10.

FIG. 8A is a diagram showing data areas of a sub-coding frame of FIG. 4A, which comprises 98 frames, as described earlier.

The first and second frames of the 98 frames, that is, frames (98n+1) and (98n+2), are used as areas for synchronization patterns S0 and S1 respectively, as has been described earlier by referring to FIG. 4A. The areas of the P and Q channels in the third to 98th frames, that is, frames (98n+3) and (98n+98), are data areas for the sub-codes P and Q, respectively, which are used for storing data used in control of, typically, accesses as described earlier.

The areas of the R to W channels in the third to 98th frames are packs 0 to 3 as shown in FIG. 8A. The data size of each pack is fixed. As shown in FIG. 8B, a pack comprises 24 symbols, namely, symbols 0 to 23. As shown in FIG. 8C, a symbol is a 6-bit data unit comprising channel data of the R, S, T, U, V and W channels of 1 frame. In this case, the data of the R channel is the MSB, and the data of the W channel is the LSB.

FIG. 9 is a diagram showing a data structure comprising the 4 packs, namely, packs 0 to 3, extracted from the sub-coding frame, with a structure shown in FIG. 8A.

As has been explained by referring to FIGS. 8A and 8B, a pack comprises 24 symbols which are each composed of 6 bits.

Thus, a pack comprises 24 symbols×6 bits/symbol=24× 6/8 bytes=18 bytes. That is, the data size of a pack is 18 bytes. The first 16 bytes are used as an ID area at the beginning of the pack, and a text-data area following the ID area as shown in FIG. 9. The remaining 2 bytes are used as a CRC area.

As described earlier, a sub-coding frame includes 4 packs, and a data unit comprising a set of such packs is defined as a packet. Since a pack comprises 24 symbols, a packet can be regarded to be composed of 4 packs×24 symbols/pack= 96 symbols.

The format of text data in the embodiment includes a CRC error detection code as described above. Error correction is not performed when text data is read out. Instead, errors are accumulated for detection. When an error is detected, data is detected again.

Thus, the same data is written into 4 packs. In addition, data is written repeatedly in packet periods, each starting at the beginning of a data series and ending at the tail of the data series. With such a scheme, a processing unit, with a complex configuration required for error correction of text data, can be eliminated from the configuration of a CD changer player of the embodiment adapted to the text data.

Figure 11:
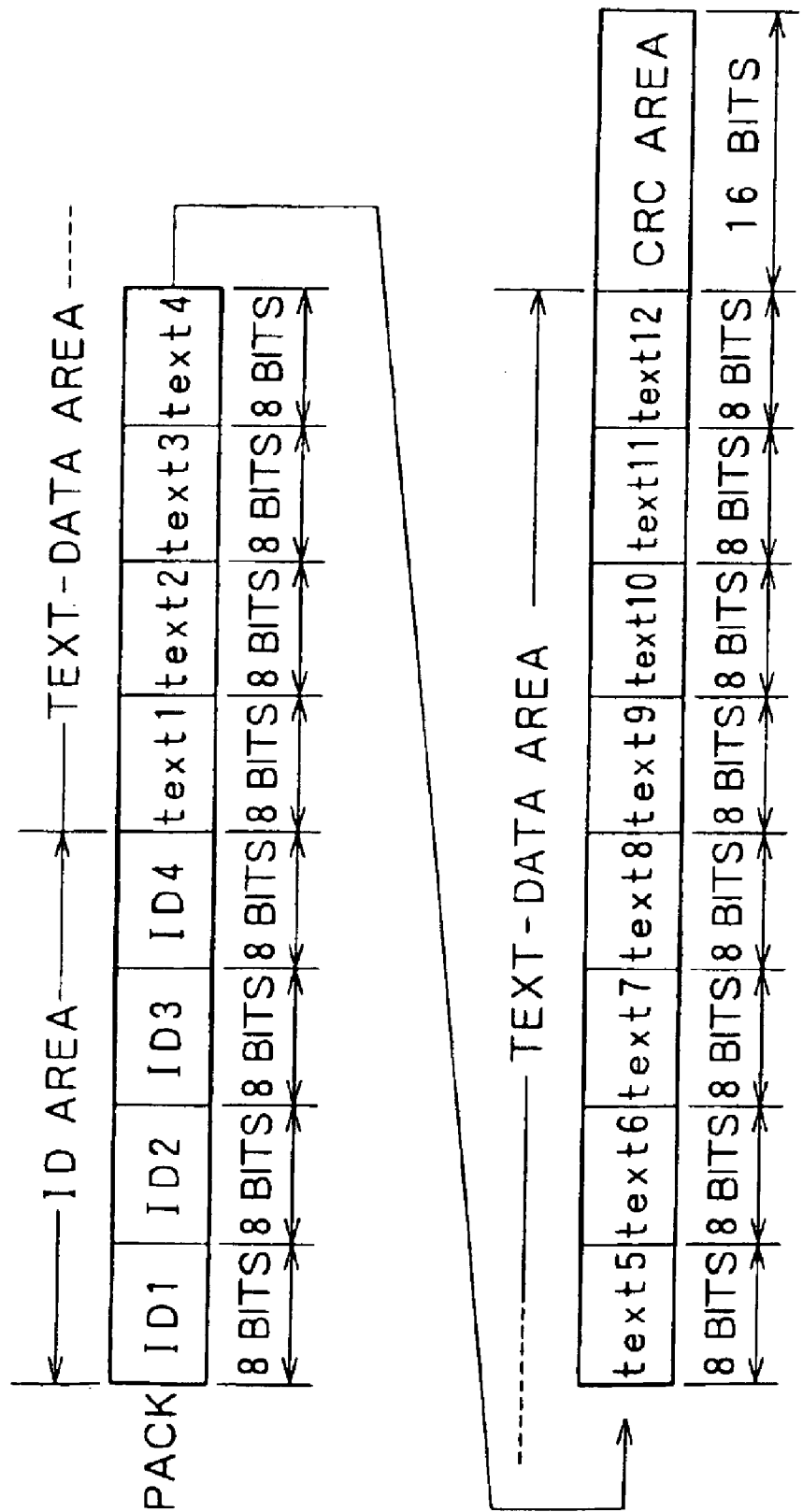
FIG. 11 is an explanatory diagram showing the structure of a pack.

FIGS. 10 and 11 are each a diagram showing a serial expression of data of 1 pack shown in FIG. 9.

As is obvious from FIG. 10A, data is treated in the format of text data adopted by the present embodiment, wherein 6-bit symbols are arranged serially to form a series of data, which is delimited at intervals of 8 bits (1 byte).

As shown in FIGS. 10B and 11, in the format of text data adopted by the embodiment, an ID area at the beginning of a pack is used for recording 4 pieces of ID data, namely, ID1, ID2, ID3 and ID4. By treating and delimiting a series of data in the format of text data in the embodiment at intervals of 8 bits (1 byte), the remaining area of 12 bytes following ID1 to ID4 at the beginning of the 16 bytes at the beginning of the pack can be reserved as a text-data area, and the remaining 2 bytes following the 16 bytes are a CRC area, as shown in FIG. 10B.

The 12-byte text-data area is treated as 8-bit data units, text 1 to text 12, as shown in a pack structure of FIG. 11.

In the format of text data adopted by the embodiment, data in a pack is controlled in 8-bit units. More detailed explanation is omitted. Text data can be processed by adopting a processing method for data of the Q channel, which is processed in 8-bit units.

Figure 12:
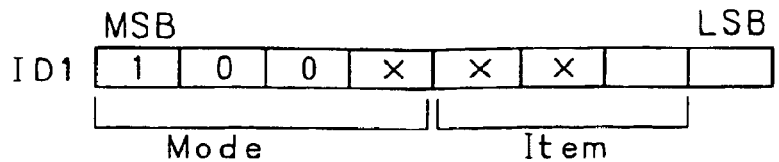
FIG. 12 is an explanatory diagram showing the structure of ID1.

In the format of text data adopted by the embodiment, in conformity with a format of a CD other than that for the text data, the high order 3 bits of ID1 at the beginning of a pack can be interpreted as a mode, and the following 3 bits can be treated as an item, as shown in FIG. 12.

In the 3-high-order-bit mode, a value of "100" is set to represent mode 4. At the present state of the art, mode 4 is undefined. In this way, if a CD for recording text data is mounted on a playback apparatus not compatible with the text data, the value set in the mode field is not recognized as a mode, causing the operation to be merely halted. As a result, no incorrect operation is carried out.

It should be noted that, since mode 5 and mode 6 also each exist as an undefined mode, these modes can also be set in the mode field in place of mode 4. As references, modes such as mode 1 for a CD-G and mode 3 for a CD-MIDI are already in use;

It is also worth noting that values for the item are not set specially. As will be described later, the value of the low-order 3 or more bits varies depending on identification contents defined by ID1. Actually, only the low-order 4 bits change.

The following is a description of definitions of ID1, ID2, ID3 and ID4, in the format of text data adopted by the embodiment, with reference to FIGS. 13A to 13D, and 14. FIGS. 13A to 13D are diagrams showing the formats of ID1 to ID4 respectively, and FIG. 14 is a table showing descriptions of identification contents specified by codes set in ID1.

Figure 13A:
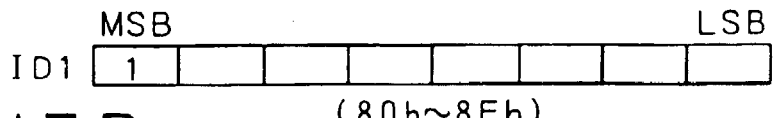
FIGS. 13A, 13B, 13C and 13D are explanatory diagrams showing the structures of ID1, ID2, ID3 and ID4.

The 8-bit ID1 data shown in FIG. 13A contains a code for identifying the meaning of a string of characters stored in an area following text 1 in a text-data area of a pack. The code can have a value in the range "80h" to "8Fh".

The high-order 4 bits of ID1 are always set at a hexadecimal value of "8h", because when the high-order 3 bits of ID1 are interpreted as a mode, the mode has a value of "100", being recognized as mode 4, as described earlier by referring to FIG. 12.

The meanings of the values "80h" to "80h" set in ID1 are shown in FIG. 14. As shown in the FIG. 14, in the case of ID1 having a value of "80h", a string of characters following text 1 is the title of an album if the value of ID2 is "00h", or the name of a piece of music recorded on the track, if the value of ID2 is in the range "01h" to "63h".

In the case of ID1 having a value of "81h", a string of characters following text 1 is the name of a performer, a conductor, or an orchestra. If ID1 has a value of "82h" or "83h", the string of characters is the name of a song-word composer or a song writer, respectively. In the case of ID1 having a value of "84h", the string of characters is the name of a music arranger. An ID1 having a value of "85h" indicates that the string of characters is a message from the CD provider such as the name of a record manufacturer, or a message from the performer.

In the case of ID1 having a value of "86h", the string of characters is a disc ID represented by, typically, a catalog number or the name of the record manufacturer. If ID1 has a value of "87h", the string of characters is text data showing a genre. In the case of ID1 having a value of "88h", the string of characters is TOC data. The TOC data typically represents contents conforming to sub-code data of the Q channel. If ID1 has a value of "89h", the string of characters is a second TOC.

ID1 values of "8Ah", "8Bh" and "8Ch" are reserved.

In the case of an ID1 value of "8Dh", the string of characters is a comment on information on manufacturing control of the CD, contents recorded in the pack, etc. If ID1 has a value of "8Eh", the string of characters is a POS code of the alburn, or an ISRC code of the track.

In the case of an ID1 value of "8Fh", the string of characters is the character code, the track number of the first track, the track number of the last track, a copy-protection flag, or a pack number in the block.

Figure 13B:
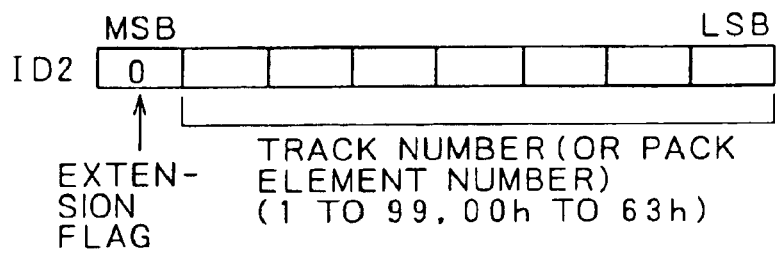

ID2, shown in FIG. 13B, is a track number identifying a track to which the string of characters following text 1 in the text-data area of the pack corresponds. The 8 bits of ID2 can have a value in the range "00h" to "63h", or the decimal-value range 0 to 99. Since a track number starts from '1', however, ID2 represents a track number in the range "01h" to "63h", or the decimal-value range 1 to 99. The value "00h" is a value representing the disc as a whole.

The MSB of ID2 is an extension flag which is always set at "0". A value of "1" indicates that the extension flag is set.

Figure 13C:
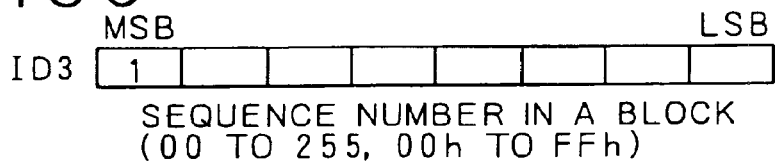

ID3 shown in FIG. 13C is an internal sequence number of the pack in the block. The internal sequence number indicates the order number of the pack in the block to which the pack pertains. The 8 bits of ID3 can have a value in the range "00h" to "FFh", or the decimal-value range 0 to 255.

Figure 13D:
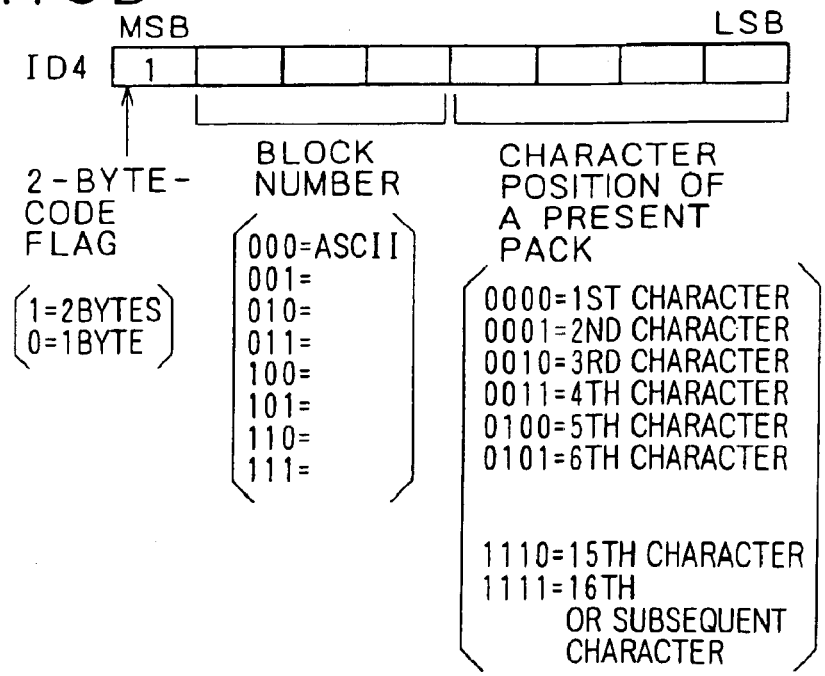

ID4, shown in FIG. 13D, represents a block number of the pack, including information for identifying a character code, and indicates the character position of the string of characters as a set.

The MSB is a 2-byte-code flag area indicating whether text data in the pack is a 1-byte code or a 2-byte code. To be more specific, the 2-byte-code flag having a value of '1' indicates that the text data is a 2-byte code, while the 2-byte-code flag having a value of '0' indicates that the text data is a 1-byte code.

The 3 bits following the MSB, that is, the second to fourth bits, are a block number identifying a block of FIG. 7B including the pack. The block number is a value in the range "000" to "111" expressed in the binary format (the decimal-value range 0 to 7). As described earlier by referring to FIG. 7B, there are a maximum of 8 blocks each having a value in the range 0 to 7 which can be expressed by the 3 bits.

In the present state of the art, at least in block #0, the use of only the 8859-1 code including the ASCII code as text data is prescribed. That is, in block #0, text data for expression generally using English as a language is stored. It should be noted that, in the following description, the language for block #0 is English for the sake of convenience, and the ASCII code is used as a character code. Since the ASCII code and the 8859-1 code are a 1-byte code, the high-order 4 bits of ID4 of each pack included in block #0 is "0000".

The low-order 4 bits of ID4 are information on a character position in the present pack. That is, the information stored in the low-order 4 bits indicates the position of a character in a string of characters forming a set, or the position of a character stored in text 1, that is, the first text in the text-data area of this pack. As shown in FIG. 13D, the value of the low-order 4 bits is in the range "0000" to "1111" expressed in binary format. In the case of a character at the 16th or subsequent position, the value is "1111".

A string of characters forming a set means, for example, a string of consecutive characters representing the name of a piece of music on 1 track, in the case of data representing the name of a piece of music on a track.

Figure 15:
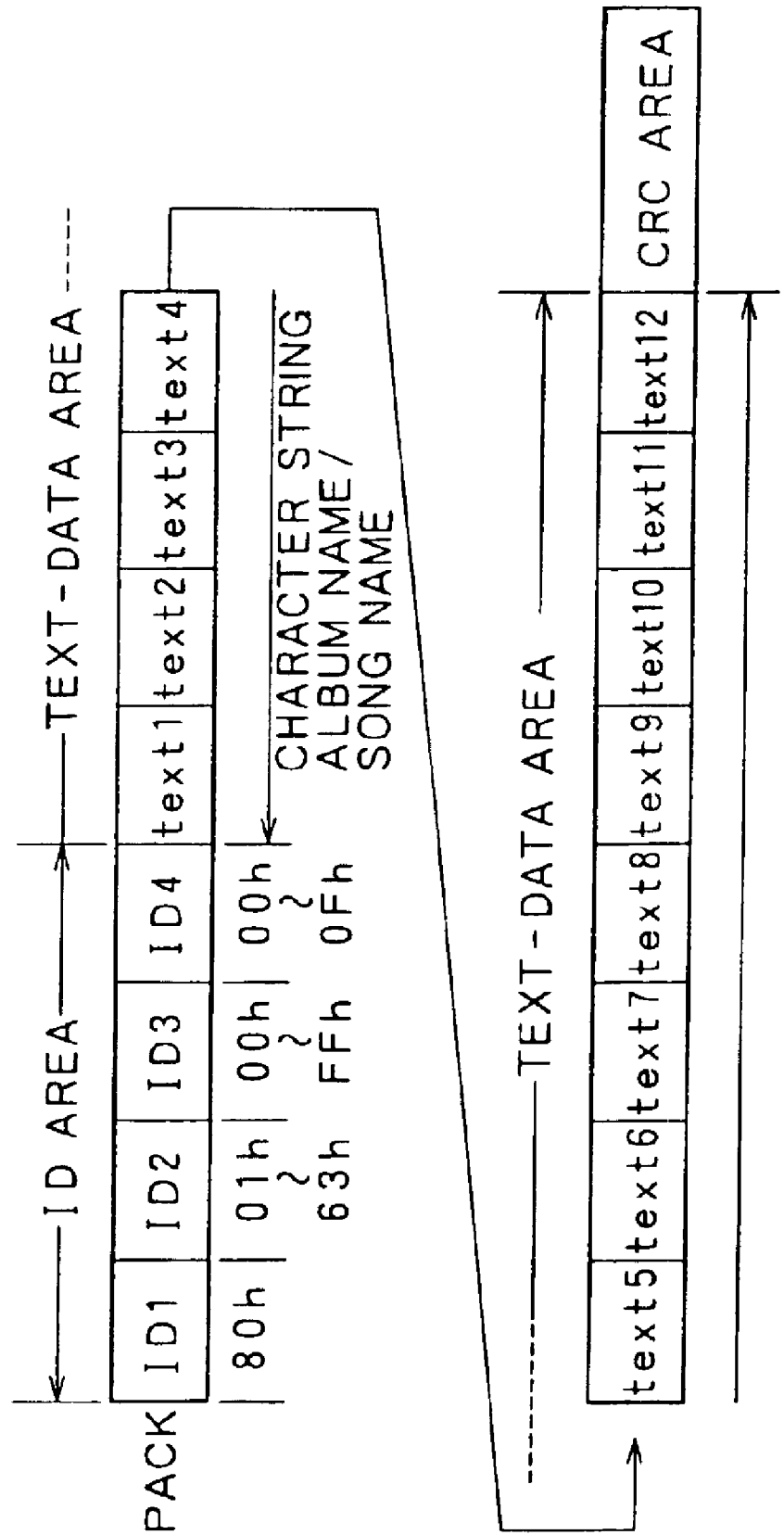
FIG. 15 is an explanatory diagram showing the structure of a pack for storing the name of a piece of music of a track as text data.

FIG. 15 is a diagram showing a typical structure of a pack, a text-data area of which is used for storing text data representing the name of a piece of music for each track. In this case, as described earlier by referring to FIGS. 13A and 14, ID1 has a value of "80h", and ID2 has a value in the range "01h" to "63h", representing a track number in the range 1 to 99, respectively, of a track indicated by a title described by text data in the pack. D3 is an internal sequence number of the pack in a block which has a value in the range "00h" to "FFh". The 3 bits in ID4, namely, the second to fourth bits, are a block number of a block of FIG. 7B that contains this pack, whereas the MSB indicates whether the character code for the block is a 2-byte code or a 1-byte code. For example, if text data of this pack is the ASCII code, the high-order bits of ID4 are "0000", as described earlier.

As described earlier, the low-order 4 bits of ID4 are information on a character position in the present pack, that is, information indicating the position of a character in a string of characters forming a set. That is, the low-order 4 bits indicate the position of a character stored in text 1. In the case of text data showing the name of a piece of music for each track, the string of characters forming a set is a string of characters representing the name of the piece of music for each track. Assume, for example, that the name of the piece of music is "THIS IS A PEN." In this case, if the second character, "H", in the string of characters "THIS_IS_A_PEN", is stored in text 1 of the pack, the lower 4 bits of ID4 of this pack will be "0001 (1h)".

Accordingly, the first character, "T", in the string of characters, "THIS_IS_A_PEN", is stored in the text-data area just before the pack. That is, the format of text data adopted in this embodiment allows a string of characters forming a set to be stored in a text-data area stretched over consecutive packs. Detailed explanation of the format is omitted.

Data comprising character codes showing the name of a piece of music for each track is stored in 8-bit text-data areas, text 1 to text 12, according to rules conforming to the text-data format adopted in this embodiment.

(5) Display Formats of the Operation Screens

Figure 16A:
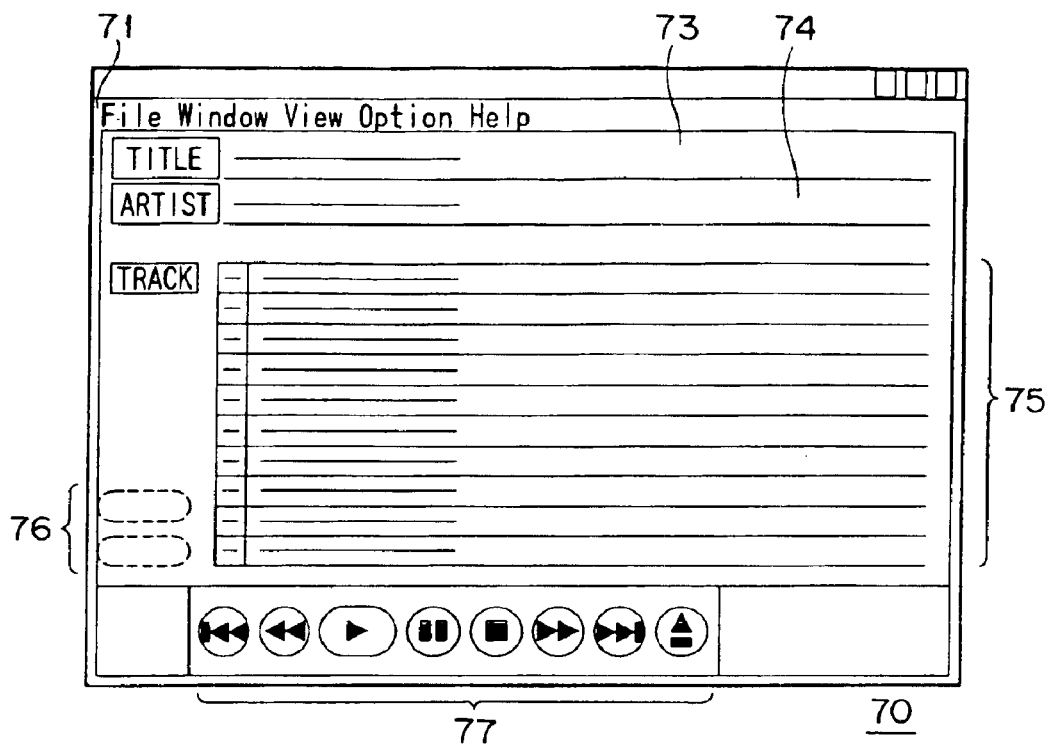
FIGS. 16A and 16B are explanatory diagrams showing a display format of a driver employed in the playback apparatus.
Figure 16B:
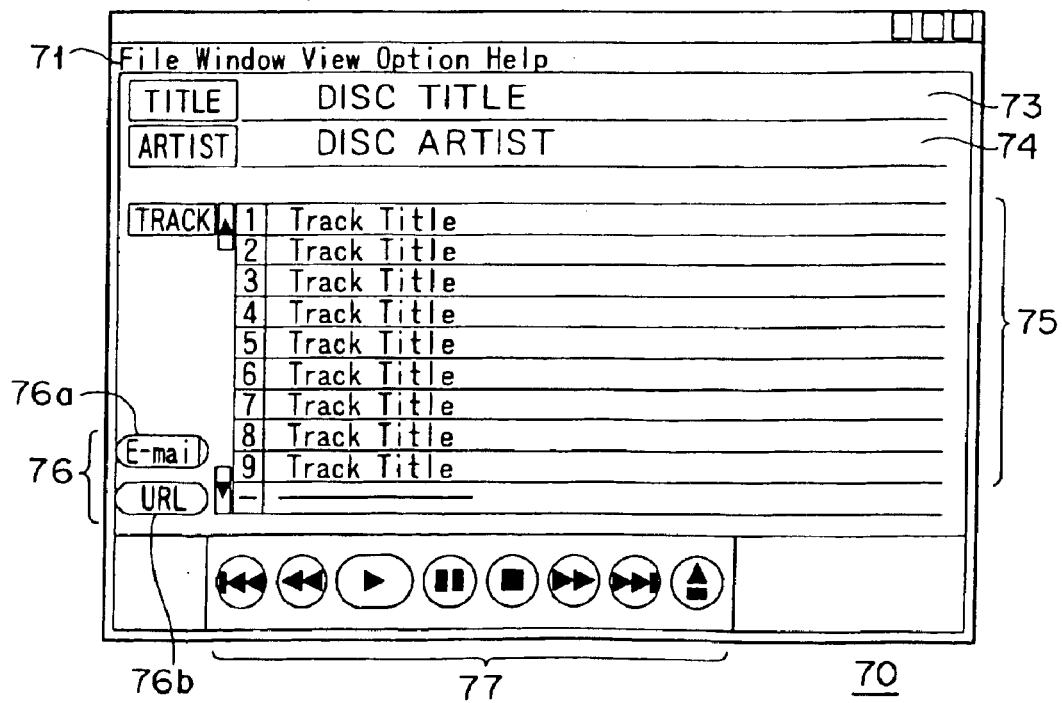

FIGS. 16A and 16B are explanatory diagrams, each showing a typical screen of an operation window 70 displayed by drive software invoked for allowing the user to carry out operations, such as, an operation to play back a signal by using the playback apparatus 20.

When the user carries out an operation to play back a signal from a disc 21 mounted on the playback apparatus 20, the computer 1 activates software for the playback apparatus 20, and displays the operation window 70 on the monitor unit 8.

A menu bar 71 formed inside the operation window 70 includes operation items, each allowing a necessary operation to be carried out by the drive software. An operation item can be selected by using, typically, a pointer, which is not shown in the figure. When a necessary operation is carried out on the selected item, typically, a pull-down menu associated with the item is displayed.

A disc-title display portion 73, an artist-name display portion 74, and a track-name display portion 75 are areas for displaying, respectively, the title of the disc 21, the names of artists, and track names, each representing the name of a piece of music which are extracted from CD-TEXT data read out from the disc 21 mounted on the playback apparatus 20.

An address-icon portion 76 is an area for displaying a string of characters extracted from the CD-TEXT data in a display format that can be operated. The string of characters has a typical format of http://www.*.*, representing a URL, or a typical format of "*@*..", representing an electronic-mail address.

An operation-icon group 77 is an area for displaying icons and performing operations, such as, playing back a signal from the disc 21, halting the disc 21, and temporarily halting the disc 21.

FIG. 16A is a diagram showing a window in a state with no disc mounted on the playback apparatus 20. In this state, no disc title, no artist names, and no track names are displayed on the window. In addition, the address-icon portion 76 is displayed in a state that can not be operated.

As the disc 21 with the TOC thereof, including CD-TEXT data, such as, the disc title, is mounted on the playback apparatus 20, the disc-title display portion 73, the artist-name display portion 74, and the track-name display portion 75 for displaying the title of the disc 21, the names of artists and track names, respectively, appear on the window as shown in FIG. 16B. In this example, 9 pieces of music are recorded on the disc 21 mounted on the playback apparatus 20.

The window of FIG. 16B also shows strings of characters representing a URL, and an electronic-mail address included in the CD-TEXT data. Information on artists and the pieces of music recorded on the disc 21 can be obtained from the URL and/or the electronic-mail address. The URL and the electronic-mail address are displayed, respectively, as a URL icon 76b and a mail icon 76a, on the address-icon portion 76, in a state that can be operated, that is, in the so-called active, or clickable display state. The information on the disc 21 such as the disc title and the addresses is read out from the disc 21 and subjected to a decoding process, before being stored in the memory unit 6. In the memory unit 6, the information is synthesized with the operation window 70, to be displayed on the screen.

It should be noted that, if address information is not included in the CD-TEXT data, the address-icon portion 76 is displayed on the window of FIG. 16B in an inactive state, as is the case with the window shown in FIG. 16A. That is, if only the string of characters representing the URL is detected, only the URL icon 76b is displayed in an active state.

With the operation window 70 displayed in a state, such as the one shown in FIG. 16B, selecting the URL icon 76b by using a pointer and clicking the icon 76b, will cause the computer 1 to first activate the browser software, in order to obtain file data from a server in the network indicated by the URL. After the browser software is activated, a communication with the server providing file data is started. It should be noted that, if the browser software has been activated by the time the URL icon 76b is operated, operating the URL icon 76b will cause a necessary communication to be started.

If the mail icon 76a is selected and operated for execution, the mailer is activated with the electronic-mail address set as a transmission destination. Thus, the user needs only to write a text for the mailer, and carry out an operation to let the mailer send the text. In this way, the text can be sent as an electronic mail.

Figure 17A:
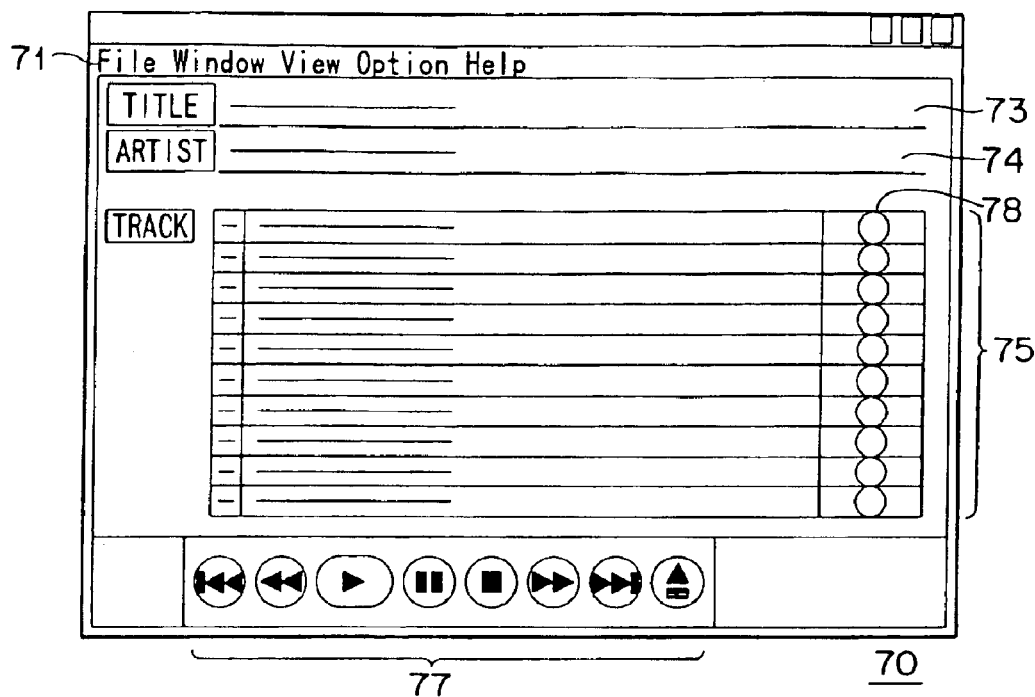
FIGS. 17A and 17B are explanatory diagrams showing another display format of a driver employed in the playback apparatus.
Figure 17B:
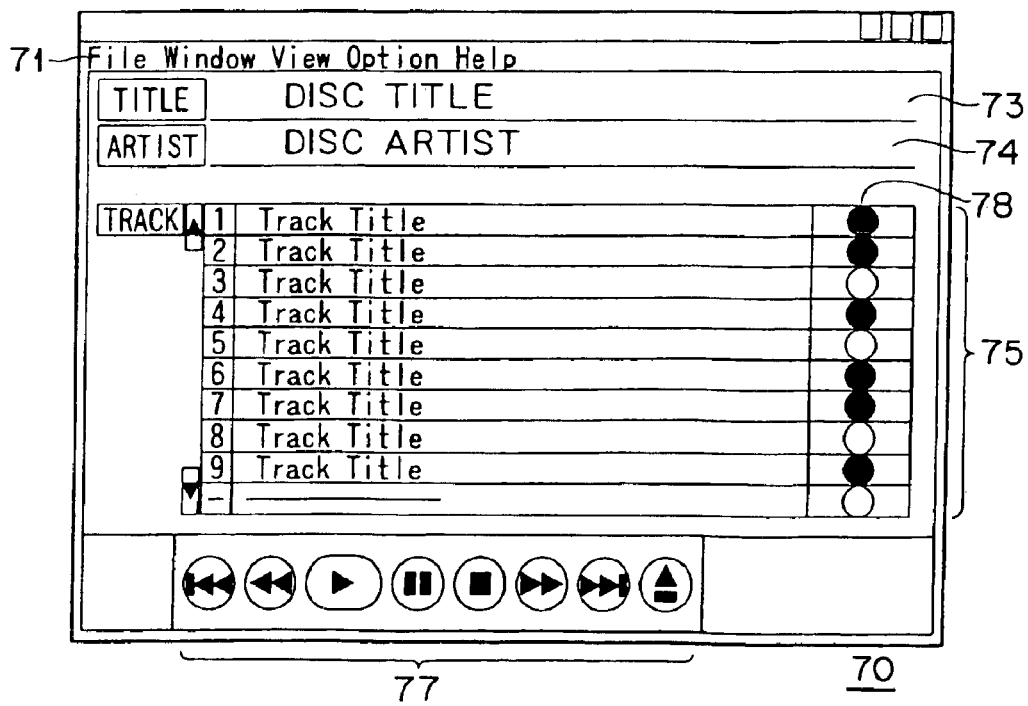

FIGS. 17A and 17B are diagrams showing typical windows for a case in which the disc 21 is a recorded omnibus album comprising pieces of music performed by a plurality of artists. For each artist or each piece of music, a URL and an electronic-mail address are recorded.

In this case, the track-name portion 75 includes a column showing an address icon 78 for each track name as a circle-shaped mark, to indicate whether or not a URL exists.

More specifically, FIG. 17A shows a window with the disc 21 not mounted yet on the playback apparatus 20. Thus, in this initial state, each address icon 78 is in an inactive state represented by a white circle in the figure.

As the disc 21 is mounted on the playback apparatus 20, the window changes from this initial state to a screen shown in FIG. 17B, on which the title of the disc, names of artists, and names of tracks are displayed with some address icons 78, each turning into, typically, a black circle to indicate an active state. A black circle indicates that a track or a piece of music on the same row as the circle has a string of characters indicating that a URL thereof has been detected. On this typical screen, tracks 1, 2, 4, 6, 7 and 9 each have address information thereof detected. That is, the display states of the address icons 78 tell the user which tracks have URLs, for the pieces of music represented by the tracks.

Assuming the user operates the address icon 78 of track 2, a communication with the URL, including the activation of the browser software, is executed. Also in this case, if the browser software has been invoked, only the communication needs to be started.

As described above, the window shows address icons 78, each representing a URL. It should be noted, however, that an address icon 78 can be used to represent an electronic-mail address as well. As an alternative, if both a URL and an electronic-mail address are detected for a track, 2 address icons 78 can also be displayed for the track, to represent the URL and the electronic-mail address, respectively.

In addition, a URL can be displayed, for example, as a string of characters, along with various kinds of other information on the disc.

Figure 18A:
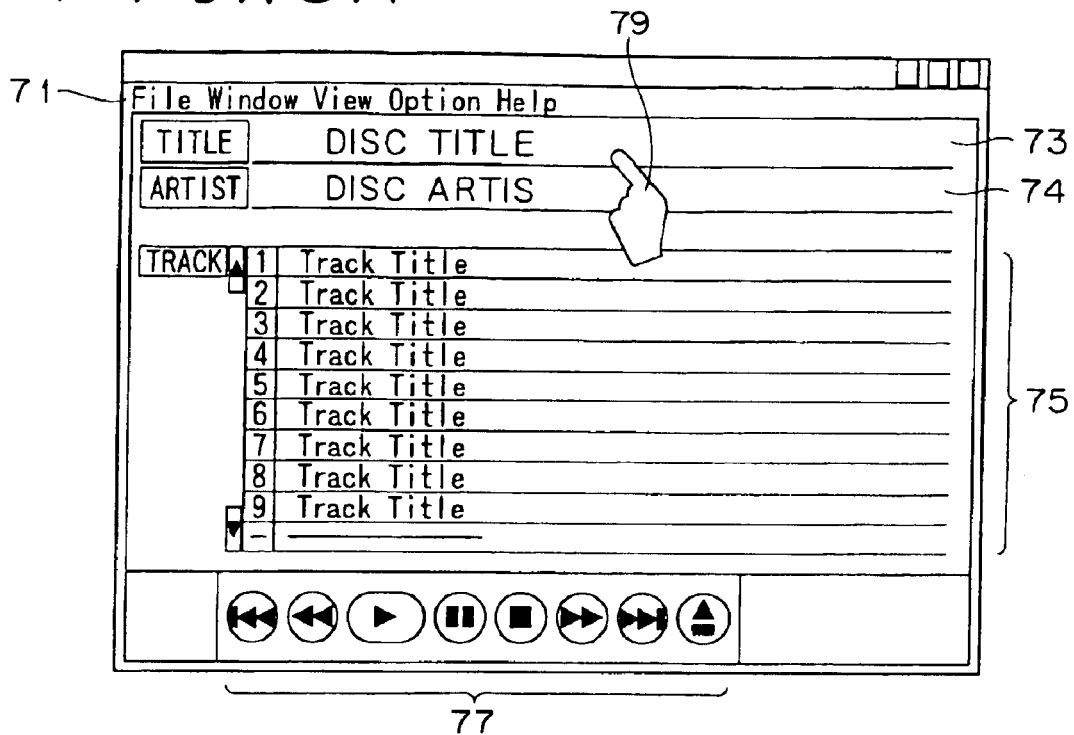
FIGS. 18A and 18B are explanatory diagrams showing still another display format of a driver employed in the playback apparatus.
Figure 18B:
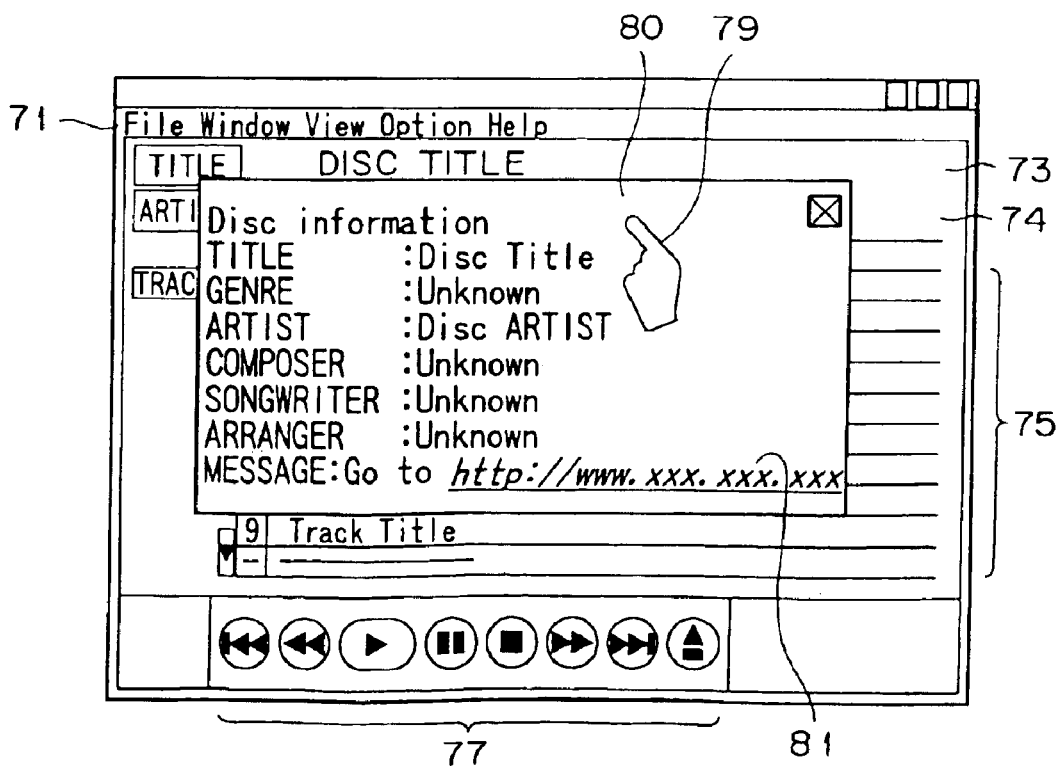

Assume, for example, that the pointer 79 is moved to the disc-title display portion 73, as shown in FIG. 18A, and clicked. In this case, an information window 80 appears to display information on the disc 21 mounted on the playback apparatus 20, as shown in FIG. 18B. To be more specific, the information window 80 displays various kinds of information, such as, the title of the disc, and a genre, along with names of artists, song writers and music arrangers. In addition, the information window 80 also includes an address display 81 showing a URL for obtaining more detailed information.

On the address display 81, a string of characters is displayed with a format of "http://www.* . . . " which is recognized as a URL in address-detection processing. The display format of the address-display 81 is, typically, italic or underlined characters, or characters having a color different from colors of other items appearing on the information window 80. By providing such different display format to the address display 81, the user is alerted that address information is also displayed on the window 80. Then, when the address display 81 is selected by the pointer 79 and clicked, a communication with the URL, indicated by the string of characters with a format of "http://www.* . . . ", is established.

In this case, since the string of characters represents a URL, the user is capable of recognizing from the beginning a server in the network, to which communication is established.

As described above, the information window 80, shown in FIG. 18B, displays a URL included in the information on the disc 21, as an example of disc information. In the case of an omnibus album such as the ones shown in FIGS. 17A and 17B, however, the information window 80 is also capable of displaying track information for a plurality of tracks, along with a URL for each piece of track (music).

Also, as described above, a URL is displayed on the address display 81 of the information window 80, shown in FIG. 18B. It should be noted, however, that an electronic-mail address can also be displayed. In this case, software for forming the electronic-mail address is activated.

In addition, the display formats of the icons and the string of characters, shown in FIGS. 16A, 16B, 17A, 17B, 18A and 18B, which indicate address information, are typical. Thus, other display formats typically suitable for the configuration of the operation window can also be used.

(6) Disc Mounting Processing

Figure 19:
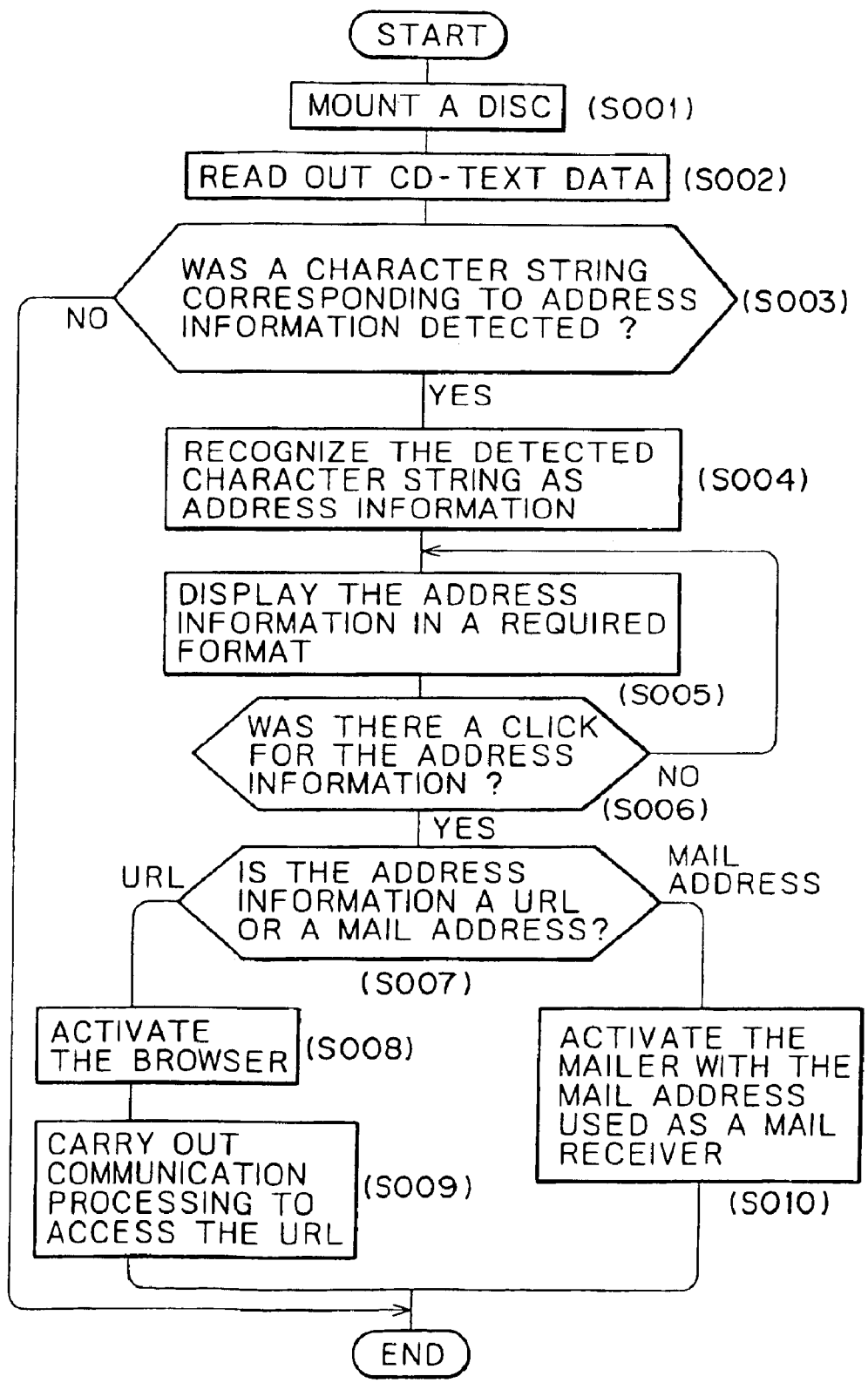
FIG. 19 shows a flowchart representing processing to recognize address information.

The following is a description of processing by the control unit 4 to establish a communication, based on a character string representing address information, such as, a URL or an electronic-mail address extracted from CD-TEXT data, with reference to a flowchart shown in FIG. 19.

The following description assumes that the user has performed initialization setting, to catalog necessary software such as the browser program and the mail program in advance into, typically, a recording medium 5 of the computer 1.

As shown in FIG. 19, the flowchart begins with a step S001 at which the disc 21 is mounted on the playback apparatus 20. The flow of the processing then goes on to a step S002 at which CD-TEXT data recorded in the lead-in area of the disc 21 is read out and decoded before being stored into the memory unit 6. It should be noted that the processing carried out at the step S001 includes formation of a judgment as to whether or not CD-TEXT data is recorded on the mounted disc 21, that is, whether or not the mounted disc 21 is a CD-TEXT disc. If CD-TEXT data is recorded on the mounted disc 21, the CD-TEXT data containing character information is searched for a string of characters. The range of the search for a string of character representing address information can be the entire character data of the CD-TEXT data, or limited to a portion assumed to include, at least, a string of character representing an address, by identifying an ID. For example, in the case of ID1 shown in FIG. 14, portions other than those indicated by ID1 values of "88h", "89h" and "8Fh" are taken as a range of the search.

Then, the flow of the processing proceeds to a step S003, to form a judgment as to whether or not a string of characters representing address information has been found in the search. If found, the flow of the processing continues to a step S004, at which the string of characters found in the search is recognized as address information, and this character data representing a URL or an electronic-mail address is stored in the memory unit 6. The flow of the processing then goes on to a step S005, at which the character data is displayed in a format for the address information described earlier. Information, such as, the title of the disc and names of artists, is displayed as ordinary character information.

Thus, when an application program for the playback apparatus 20 is invoked, it is possible to form picture data for address icons 76 and 78 to appear on the operation windows 70 shown in FIGS. 17A and 17B, or picture data for the address display 81 to appear on the information window 80 shown in FIG. 18B in the memory unit 6. The icons 76 and 78, or the address display 81 based on these pieces of picture data, are then displayed on the monitor unit 8 through the picture-signal processing unit 7.

Subsequently, the flow of the processing goes on to a step S006, to form a judgment as to whether a click operation has been carried out by using the keyboard 2, or the mouse 3 on the address icon 76, or the address display 81 appearing, respectively, on the operation window 70 or the information window 80, which is displayed on the monitor unit 8. If a click operation has been carried out, the flow of the processing proceeds to a step S007, to form a judgment as to whether the address icon 76, or the address display 81 represents a URL, or an electronic-mail address.

If the address icon 76 or the address display 81 represents a URL, the flow of the processing continues to a step S008, at which the browser software is activated. The flow of the processing then goes on to a step S009, at which communication processing to make an access to the URL is carried out.

If the address icon 76 or the address display 81 represents an electronic-mail address, the flow of the processing continues to a step S010, at which the processing to activate the mailer is carried out with the electronic-mail address set as a transmission destination.

As described above, the CD-TEXT data including character information is searched for a string of characters to allow the string of characters to be recognized as address information. Then, access to the network based on the address information can be made.

Thus, it is no longer necessary for the user to enter a string of characters representing an address. Since address information detected from the CD-TEXT data is displayed as an icon, or a string of characters with a predetermined format, the user easily recognizes the address information.

Since all the recorded characters are searched, it is not necessary for the creator of the CD-TEXT to record an address on the disc 21 in a special format.

As described above, the embodiment implements a playback apparatus for playing back information from a CD-DA disc. However, the present invention can also be applied to a playback apparatus for playing back information from a disc such as a DVD.

What is claimed is:

1. An apparatus for processing a playback signal, said apparatus comprising:

playback means operable for reproducing information recorded on a rotatable recording medium, said recorded information representing audio programs and character information associated with said programs including a title associated with the recording medium, an artist or artists of one or more of the audio programs, a title of the one or more audio programs, a Uniform Resource Locator (URL) and an electronic mail address (e-mail);

character-information detecting means for detecting said character information recorded in an area of said recording medium and reproduced by said playback means;

searching means for searching said detected character information for address information representing the one of (i) the URL used to obtain information associated with said programs and (ii) the electronic mail address (e-mail);

means for displaying the recording medium title, the artist or artists, the audio program title or titles, the URL, and the electronic mail address (email) on a single screen; and means for communicating with said URL or electronic mail address.

2. An apparatus according to claim 1 wherein the display means displays said address information in a format different from formats of other character information.

3. An apparatus according to claim 2 wherein said display means displays indicating information indicating whether or not said character information includes said address information.

4. An apparatus according to claim 3 wherein said displayed indicating information is an icon.

5. An apparatus according to claim 2 further comprising activating means for activating software associated with said address information.

6. A playback-signal processing apparatus comprising:

storage means for storing information representing audio programs and character information including a title associated with the recording medium, an artist or artists of one or more of the audio programs, a title of the one or more audio programs, a Uniform Resource Locator (URL) and an electronic mail address (e-mail) reproduced from a rotatable recording medium, said character information being associated with said programs recorded on said recording medium;

search means for searching said character information for address information representing the one of (i) the URL used to obtain information associated with said programs and (ii) the electronic mail address (e-mail)

display means for displaying the recording medium title, the artist or artists, the audio program title or titles, the URL, and the electronic mail address (email) on a single screen, said character information and indicating information indicating whether or not said address information is included in said character information; and means for communicating with said URL or electronic mail address.

7. A playback-signal processing apparatus according to claim 6 wherein said indicating information is an icon.

8. A playback-signal processing apparatus according to claim 6 further comprising activating means for activating software associated with said address information.

9. A playback-signal processing apparatus according to claim 6 wherein said recording medium comprises a plurality of tracks and said display means displays said indicating information for each of said respective tracks.

10. A method for reproducing character information from a rotatable recording medium for recording audio data, said method comprising the steps of:

reproducing information representing audio data and character information, including a title associated with the recording medium, an artist or artists of one or more of the audio programs, a title of the one or more audio programs, a Uniform Resource Locator (ULRL) and an electronic mail address (e-mail) recorded on said rotatable recording medium, said character information being associated with said audio data;

searching said reproduced character information for address information representing the the URL used to obtain further information about said audio data and the electronic mail address (e-mail);

displaying the the recording medium title, the artist or artists, the audio program title or titles, the URL, and the electronic mail address (email) on a single screen, said character information and information indicating whether or not said address information is included in said character information; and communicating with said URL or electronic mail address.

11. A method according to claim 10 wherein said indicating information is an icon.

12. A method according to claim 10 wherein said address information included in said character information is displayed in a format different from a format of other character information.

13. A method according to claim 10 further comprising a step of activating software when said address information is included in said character information.

\* \* \* \* \*

UNITED STATES PATENT AND TRADEMARK OFFICE
CERTIFICATE OF CORRECTION

PATENT NO. : 6,961,903 B2 Page 1 of 1
DATED : November 1, 2005
INVENTOR(S) : Yosuke Suzuki et al.

It is certified that error appears in the above-identified patent and that said Letters Patent is hereby corrected as shown below:

Column 7,
Line 21, change "subcoding" to -- sub-coding --.
Line 64, change "4 bit" to -- 4-bit --.

Column 11,
Line 25, change "80h" to -- 8Fh --.
Line 55, change "alburn" to -- album --.

Column 12,
Line 55, change "D3" to -- ID3 --.

Column 18,
Line 4, change "mail)" to -- mail); --.
Line 37, change "the the URL" to -- the URL --.
Line 41, change "the the recording" to -- the recording --.

Signed and Sealed this

Sixteenth Day of May, 2006

JON W. DUDAS
*Director of the United States Patent and Trademark Office*